(12) United States Patent
Kubota et al.

(10) Patent No.: US 6,828,010 B2
(45) Date of Patent: Dec. 7, 2004

(54) LAMINATED POLYESTER FILM

(75) Inventors: Yuri Kubota, Otsu (JP); Takashi Mimura, Otsu (JP); Yasushi Takada, Otsu (JP); Masato Yanagibashi, Otsu (JP)

(73) Assignee: Toray Industries, Inc. (JP)

(*) Notice: Subject to any disclaimer, the term of this patent is extended or adjusted under 35 U.S.C. 154(b) by 194 days.

(21) Appl. No.: 10/276,261
(22) PCT Filed: Mar. 13, 2002
(86) PCT No.: PCT/JP02/02379
  § 371 (c)(1),
  (2), (4) Date: Dec. 13, 2002
(87) PCT Pub. No.: WO02/074538
  PCT Pub. Date: Sep. 26, 2002

(65) Prior Publication Data
  US 2004/0028924 A1 Feb. 12, 2004

(51) Int. Cl.$^7$ .................. B32B 27/08; B32B 27/20; B32B 27/30
(52) U.S. Cl. .............. 428/213; 428/343; 428/323; 428/480; 428/483; 428/910; 525/437; 525/444; 525/448; 528/293; 528/294; 528/295
(58) Field of Search .................. 428/213, 343, 428/323, 480, 483, 910; 525/437, 444, 448; 528/293, 294, 295

(56) References Cited

FOREIGN PATENT DOCUMENTS

| JP | 10-086303 A | * | 4/1998 |
| JP | 2000-025182 A | * | 1/2000 |
| JP | 2000-272070 A | * | 10/2000 |

* cited by examiner

*Primary Examiner*—Vivian Chen
(74) *Attorney, Agent, or Firm*—Piper Rudnick LLP

(57) ABSTRACT

Provided is a laminated polyester film, in which a laminated layer comprising two types of polyester resins having different glass transition points from each other is formed on at least one side of a base polyester film wherein the two types of polyester resins are composed of a polyester resin (A) having a glass transition point of from 60° C. to 100° C., and a polyester resin (B) having a glass transition point of from 0° C. to 60° C. and the polyester resin (B) contains a specified component, and a dicarboxylic acid component having a sulfonic acid metal base is set as a specified ratio of the entire dicarboxylic acid components in the polyester resins (A) and (B), satisfies adhesiveness to various types of coating materials which has conventionally been incompatible and, further, satisfies anti-blocking properties, transparency, scratch resistance and the other properties.

16 Claims, No Drawings

LAMINATED POLYESTER FILM

TECHNICAL FIELD

The present invention relates to improvements in laminated polyester films, and more specifically to a laminated polyester film excellent in adhesiveness to various types of coating materials.

BACKGROUND OF THE INVENTION

Since a biaxially oriented polyester film has excellent properties in dimensional stability, mechanical characteristics, thermal resistance, transparency, electric characteristics, chemical resistance and the like, it has widely been used as a base film for various types of products, such as a magnetic recording material, a packaging material, an electric insulating material, various types of photographic materials, a graphic arts material and the like.

Ordinarily, since a surface of the biaxially oriented polyester film is highly oriented in terms of crystallinity, it has a drawback of poor adhesiveness to various types of paints and inks. To this end, various studies for imparting adhesiveness to a surface of a polyester film by means of various types of methods have so far been conducted.

Heretofore, as the methods for imparting the adhesiveness to the surface of the polyester film, various types of adhesiveness imparting processing which performs on a polyester film as abase film, for example, a surface activation method such as a corona discharge treatment, ultraviolet ray irradiation processing, plasma processing and the like to be performed on a surface, a surface etching method to be performed by using chemicals such as an acid, an alkali, an amine aqueous solution and the like, a method of providing various types of resins each having adhesiveness such as an acrylic resin, a polyester resin, a urethane resin, a polyolefin resin and the like on a surface of film as a primer layer and other methods have been studied.

Among these methods, as examples of providing a polyester resin as a primer layer, mentioned are JP-A-10-86303, JP-A-60-198240, JP-A-2000-25182, JP-A-1-237138 and the like.

JP-A-10-86303 discloses a constitution, comprising two types of polyester resins having different glass transition temperatures (Tg's) from each other and a cross-linking agent, in which adhesiveness to various types of paints or inks and that under high temperature and high humidity are simultaneously viable. However, this constitution was unable to simultaneously satisfy adhesiveness to various types of coating materials such as a UV-curable ink, an oxidative polymerization-type ink, a solvent-type ink, water-soluble or hydrophilic resins, for example, polyvinyl alcohol and the like; therefore, this constitution was insufficient.

Further, JP-A-60-198240 discloses that adhesiveness to a metal can be satisfied by polyester comprising from 65% by mol to 95% by mol of isophthalic acid as a copolymerization component. However, such a constitution was unable to simultaneously satisfy adhesiveness to various types of same coating materials as described above and anti-blocking properties of laminated layers were insufficient thereamong.

Furthermore, JP-A-2000-25182 discloses that a constitution comprising two types of polyester resins having different Tg's from each other, an aliphatic amide and/or an aliphatic bisamide has good adhesiveness to a hard coat layer. However, the constitution was unable to simultaneously satisfy adhesiveness to various types of same coating materials as described above and anti-blocking properties of coated surfaces were insufficient thereamong.

Still further, JP-A-1-237138 discloses that a laminate prepared by co-extruding two types of polyester resins satisfies a heat sealing property. However, the laminate was unable to simultaneously satisfy adhesiveness to various types of same coating materials as described above.

Namely, there was a problem in that the polyester films as described above were unable to simultaneously satisfy adhesiveness to inks, particularly, those of UV-curable type which generates shrinkage when cured, and water-soluble, hydrophilic resins such as polyvinyl alcohol and the like thereby being insufficient in many cases.

The subject of the present invention is to provide a laminated polyester film, which has improved such drawbacks as described above, satisfies adhesiveness to various types of coating materials which was incompatible conventionally, further, satisfies anti-blocking properties, transparency, scratch resistance and the like.

DISCLOSURE OF THE INVENTION

In order to solve the above-described subject, a laminated polyester film according to the present invention comprises being characterized in that a laminated layer comprising two types of polyester resins having different glass transition points from each other is formed on at least one side of a polyester film wherein the above-described two types of polyester comprises a polyester resin (A) having a glass transition point of from 60° C. to 100° C. and a polyester resin (B) having a glass transition point of from 0° C. to 60° C. and wherein the above-described polyester resin (B) at least contains from 65% by mole to 95% by mol of isophthalic acid as an acid component or from 50% by mol to 95% by mol of diethylene glycol as a diol component and, further, a dicarboxylic acid component having a sulfonic acid metal base in entire dicarboxylic acid components in the polyester resins (A) and (B) satisfies the following relation:

$$Sa > Sb \geq 5\% \text{ by mol,}$$

wherein

Sa represents a quantity (% by mol) of a dicarboxylic acid component having a sulfonic acid metal base in entire dicarboxylic acid components in the polyester resin (A); and Sb represents a quantity (% by mol) of a dicarboxylic acid component having a sulfonic acid metal base in entire dicarboxylic acid components in the polyester resin (B).

BEST MODE FOR CARRYING OUT THE INVENTION

Hereinafter, the present invention will be described in detail with reference to preferred embodiments.

First of all, polyester film in a state before a laminated layer is formed thereon, in a laminated polyester film that is prepared by forming a laminated layer comprising two types of polyester resins having different glass transition points from each other on at least one side of polyester film according to the present invention, will be described.

In the polyester film according to the present invention, the term "polyester" is a generic name denoting a polymer in which ester bonding is allowed to be a primary bonding chain in a main chain thereof. As a preferred polyester, that having, as a principal constituent, at least one constituent selected from the group consisting of ethylene terephthalate, propylene terephthalare, ethylene-2,6-naphthalate, butylenes terephthalate, propylene-2,6-naphthalate, ethylene-α, β-bis(2-chlorophenoxy)ethane-4,4'-dicarboxylate, ethylene-α,β-bis(phenoxy)ethane-4,4'-dicarboxylate and the like can be used. These constituents may be used either individually or in any combinations thereof; however, it is preferable to use polyester in which ethylene terephthalate, among these constituents, is a principal constituent from an overall judgment taking quality, economy and the like into consideration. Further, such polyester may further be copolymerized with any other dicarboxylic acid component or diol component partially, preferably at a ratio of 20% by mol or less.

Further, a base polyester film in the laminated polyester film according to the present invention preferably further contains a polyester resin copolymerized with an isophthalic acid component or a diethylene glycol component as a principal constituent; the base polyester film in the laminated polyester film according to the present invention more preferably further contains a polyester resin copolymerized with the isophthalic acid component and the diethylene glycol component as a principal constituent. By taking such constitutions, adhesiveness between the laminated layer according to the present invention and the base polyester film is remarkably enhanced.

A quantity of the polyester resin, which is preferably further contained in the base polyester film, copolymerized with the isophthalic acid component and/or the diethylene glycol component as a principal constituent is preferably from 5 ppm to less than 20% by weight from the standpoint of adhesiveness.

The polyester resin, which can be further contained in the base polyester film, copolymerized with the isophthalic acid component and/or the diethylene glycol component as a principal constituent can be contained in the base polyester film by utilizing as a reworked material the laminated polyester film in which the above-described polyester resin is formed as the laminated layer.

As the polyester resin which forms the laminated layer of the laminated polyester film capable of being utilized as the reworked material, mentioned is, as an example, a polyester resin (B) to be described below. The polyester resin which forms the laminated layer of the laminated polyester film capable of being utilized as the reworked material preferably contains 65% by mol or more of isophthalic acid in the entire dicarboxylic acid components, and/or 50% by mol or more of diethylene glycol in the entire diol components.

The reworked material is not particularly limited, but, for example, the above-described laminated polyester film or waste film generated therefrom is crushed to produce a crushed material and, then, the thus-produced crushed material is melt-extruded thereby being capable of obtaining the reworked material in pellet form. The above-described reworked material can be utilized by mixing it with polyester which constitutes the above-described polyester film. A ratio of such pellets to be used in the laminated polyester film according to the present invention as the reworked material is preferably 50% by weight or less, and more preferably 40% by weight or less. When the above-described reworked material is unduly large in content, the laminated polyester film may be tinted.

Further, in polyester of the base polyester film in the laminated polyester film according to the present invention, various types of additives, for example, an antioxidant, a heat-resistant stabilizer, a weather-resistant stabilizer, an ultraviolet ray absorber, an organic slipperiness imparting agent, a pigment, a dye, organic or inorganic fine particles, a filler, an antistatic agent, a nucleating agent and the like, may be added to such an extent as does not deteriorate characteristics thereof.

It is favorable from the standpoint of embodying the present invention that a limiting viscosity (measured in o-chlorophenol at 25° C.) of polyester of the base polyester film in the laminated polyester film according to the present invention is in the range of preferably from 0.4 dl/g to 1.2 dl/g and more preferably from 0.5 dl/g to 0.8 dl/g.

Preferably, the polyester film using the above-described polyester is biaxially oriented in a state in which the laminated layer is provided on at least one side thereof. Such a biaxially oriented polyester film is ordinarily intended to signify a polyester film prepared by stretching a polyester sheet or a polyester film in a non-stretched state from about 2.5 times to 5 times in both a longitudinal direction and a width direction and, then, being subjected to a thermal treatment to complete crystalline orientation therein whereupon a biaxial orientation pattern is exhibited by wide-angle X-ray diffraction.

Thickness of the polyester film is not particularly limited, but is appropriately selected depending on applications in which the laminated film according to the present invention is used; however, from standpoint of mechanical strength, handling convenience and the like, the thickness thereof is preferably from 1 μm to 500 μm, more preferably from 5 μm to 300 μm, further preferably from 15 μm to 260 μm and most preferably from 30 μm to 210 μm. Further, the thus-obtained film can also be used after being sticked by various types of methods.

Further, a white polyester film can favorably be used as a base film. Such white polyester film is not particularly limited so long as the polyester film is colored white, but whiteness degree thereof is preferably from 65% to 150% and more preferably from 80% to 120%; on this occasion, when indicated in terms of optical density at 100 μm, it comes to be preferably 0.5 to 5 and more preferably from 1 to 3. For example, when the base film having a lower optical density is used, opacifying properties thereof are deteriorated, whereas, when the base film having a lower whiteness degree is used, whiteness sensible to a naked eye tends to be decreased.

Methods of obtaining these ranges of whiteness degree and optical density are not particularly limited, but they can ordinarily be obtained by adding inorganic particles or a resin incompatible with polyester. A quantity to be added is, in a case of the inorganic particles, preferably from 5% by weight to 35% by weight and more preferably from 8% by weight to 25% by weight. On the other hand, when the resin incompatible with polyester is added, the quantity to be added is preferably from 3% by volume to 35% by volume and more preferably from 6% by volume to 25% by volume.

As for the inorganic particles to be added to the polyester film, inorganic particles having an average particle diameter of preferably from 0.1 μm to 4 μm and more preferably from 0.3 μm to 1.5 μm and the like can be used as illustrative examples. Specifically, barium sulfate, calcium carbonate, calcium sulfate, titanium oxide, silica, alumina, barium titanate, talc, clay and the like or mixtures thereof can be used and, further, these inorganic particles may be used simultaneously with other inorganic compounds, for example, calcium phosphate, titanium oxide, mica, zirconia, tungsten oxide, lithium fluoride, calcium fluoride and the like.

Resins incompatible with polyester to be added to the polyester film are not particularly limited; on this occasion, when they are mixed with polyethylene terephthalate or polyethylene-2,6-naphthalate, examples thereof include an acrylic resin, polyethylene, polypropylene, a modified olefin resin, a polybutylene terephthalate-type resin, a phenoxy resin, polyphenylene oxide and the like whereupon they may be used simultaneously with the above-described inorganic particles. For example, particularly, the white polyester film, which has been prepared by mixing inorganic particles or a resin incompatible with polyester into polyester and, then, biaxially stretching, having a void therein and a specific gravity in the range of from 0.5 to 1.3 allows the base film itself to be lighter in weight. For example, when used for a receiving sheet application, there is an advantage that printing characteristics are enhanced and the like.

Further, this white polyester film is laminated with another film which is discolored in different color or a transparent film to form a laminate having 2 layers or more and, then, the thus-formed laminate may be used as a base film.

Next, a laminated layer in the laminated polyester film in which the laminated layer comprising two types of polyester resins having different glass transition points from each other is formed on at least one side of the polyester film according to the present invention will be described.

The term "laminated layer" as used herein is intended to include an article in a film state which has been formed in a laminate structure-type on a surface of the polyester film that is to be a base sheet and is present thereon. The laminated layer itself may be composed of either a monolayer or a plurality of layers.

The laminated layer according to the present invention uses two types of polyester resins having different glass transition points (hereinafter referred to also as Tg's in short) from each other; on this occasion, Tg's in the two types of polyester resins are different from each other and, further, it is necessary to satisfy that Tg of a polyester resin (A) is from 60° C. to 100° C. and that of a polyester resin (B) is from 0° C. to 60° C. The Tg of the above-described polyester resin (A) is preferably from 70° C. to 90° C. from the standpoint of anti-blocking properties and that of the above-described polyester resin (B) is preferably from 0° C. to less than 60° C. and more preferably from 10° C. to 45° C. from the standpoint of adhesiveness to various types of coating materials.

The two types of polyester resins (A) and (B) having different glass transition points from each other which form the laminated layer according to the present invention each contain a dicarboxylic acid component having a sulfonic acid metal base and a content thereof satisfies the following relation:

$Sa > Sb \geqq 5\%$ by mol wherein
Sa represents a quantity (% by mol) of the dicarboxylic acid component having the sulfonic acid metal base in entire dicarboxylic acid components contained in the polyester resin (A); and
Sb represents a quantity (% by mol) of the dicarboxylic acid component having the sulfonic acid metal base in entire dicarboxylic acid components contained in the polyester resin (B).

On this occasion, Sb is preferably 7% by mol or more and more preferably from 7% by mol to 9% by mol. When either Sa or Sb is less than 5% by mol, adhesiveness particularly to a hydrophilic resin such as polyvinyl alcohol is deteriorated.

By satisfying the relation $Sa > Sb \geqq 5\%$ by mol, it is considered that the adhesiveness to various types of coating materials and the anti-blocking properties which are intrinsically incompatible are allowed to be compatible with each other.

Examples of dicarboxylic acid components each having the sulfonic acid metal base contained in the polyester resin which constitutes the laminated layer according to the present invention include alkali metal salts, alkali earth metal salts and the like of sulfoterephthalic acid, 5-sulfoisophthalic acid, 4-sulfoisophthalic acid, 4-sulfonaphthalene-2,7-dicarboxylic acid, sulfo-p-xylylene glycol, 2-sulfo-1,4-bis(hydroxyethoxy)benzene and the like; however, the present invention is by no means limited to these examples.

The polyester resin (A) for use in the laminated layer according to the present invention contains terephthalic acid preferably at a ratio of 70% by mol or more, and more preferably at a ratio of 75% by mol or more as a dicarboxylic acid component in the entire dicarboxylic acid components. On this occasion, other components than terephthalic acid and the dicarboxylic acid components having a sulfonic acid metal base are not particularly limited, but, for example, components to be described below and the like can be used. By allowing Tg to be in the range of from 60° C. to 100° C. and defining a principal component, the anti-blocking properties can effectively be expressed.

Further, it is necessary that the polyester resin (B) used in the laminated layer according to the present invention at least contains isophthalic acid at a ratio of from 65% by mol to 95% by mol as a dicarboxylic acid component in the entire dicarboxylic acid components or diethylene glycol at a ratio of from 50% by mol to 95% by mol as a diol component in the entire diol components; on this occasion, it is preferable that isophthalic acid is at least contained at a ratio of from 65% by mol to 95% by mol as a dicarboxylic acid component in the entire dicarboxylic acid components and diethylene glycol is at least contained at a ratio of from 50% by mol to 95% by mol as a diol component in the entire diol components. In this case, other components than isophthalic acid, diethylene glycol and the dicarboxylic acid having a sulfonic acid metal base are not particularly limited, but, for example, components to be described below can be used. By allowing Tg to be in the range of from 0° C. to 60° C. and defining a principal component, excellent adhesiveness to various types of coating materials which have not conventionally been compatible can be achieved.

A content of isophthalic acid contained in the polyester resin (B) used in the laminated layer according to the present invention is preferably in the range of from 70% by mol to 95% by mol and, so long as it is in this range, favorable adhesiveness can be obtained.

A content of diethylene glycol contained in the polyester resin (B) used in the laminated layer according to the present invention is preferably in the range of from 60% by mol to 90% by mol and, so long as it is in this range, favorable adhesiveness can be obtained.

Further, it is more preferable that, in the polyester resin (B) used in the laminated layer according to the present invention, the content of isophthalic acid being in the range of from 65% by mol to 95% by mol as a dicarboxylic acid component in the entire dicarboxylic acid components and the content of diethylene glycol being in the range of from 50% by mol to 95% by mol as a diol component in the entire diol components are simultaneously satisfied. However, for example, when isophthalic acid occupies from 65% by mol to 95% by mol in the entire dicarboxylic acid components, a preferred range of diethylene glycol is from 40% by mol to 95% by mol and a more preferred range thereof is from 50% by mol to 95% by mol, while, when diethylene glycol occupies from 50% by mol to 95% by mol in the entire diol components, a preferred range of isophthalic acid is from 45% by mol to 95% by mol and a more preferred range thereof is from 50% by mol to 90% by mol. When a quantity of isophthalic acid component is unduly small, adhesiveness to ink which generates shrinkage when cured such as, particularly, UV-curable ink may be deteriorated, while, when a quantity of diethylene glycol component is unduly small, adhesiveness to ink which generates shrinkage when cured as, particularly, UV-curable ink or a hydrophilic resin such as polyvinyl alcohol or the like may be deteriorated.

Though the polyester resin (A) and the polyester resin (B) can be used in any mixing ratio therebetween, the ratio between the polyester resin (A)/the polyester resin (B) is, in terms of in a weight ratio of solid contents, preferably from 10/90 to 90/10, more preferably from 30/70 to 80/20 and still more preferably from 50/50 to 80/20 from the standpoint of adhesiveness. When the polyester resin (A) is unduly small, the anti-blocking properties may be deteriorated, while, when the polyester resin (B) is unduly small, the adhesiveness to ink which generates shrinkage when cured such as, particularly, UV-curable ink may be deteriorated.

The laminated layer according to the present invention comprises two types of polyester resins having different Tg's from each other as described above as principal constituents; on this occasion, the principal constituent according to the present invention is concerned with a case in which a total of the above-described two types occupies 70% by weight or more, preferably 80% by weight or more, and more preferably 90% by weight or more in the laminated layer.

The polyester resins (A) and (B), which are constituents of the laminated layer according to the present invention, each have an ester bond in a main chain or a side chain thereof and such polyester resins can be prepared by subjecting a dicarboxylic acid and a diol to polycondensation.

As carboxylic acid components which constitute the polyester resins (A) and (B), aromatic, aliphatic and alicyclic dicarboxylic acids and polyvalent carboxylic acids each having 3 valences or more can be used. As the aromatic dicarboxylic acids, terephthalic acid, isophthalic acid, orthophthalic acid, phthalicacid, 2,5-dimethylterephthalicacid, 1,4-naphthalene dicarboxylic acid, biphenyl dicarboxylic acid, 2,6-naphthalene dicarboxylic acid, 1,2-bisphenoxyethane-p,p'-dicarboxylic acid, phenylindane dicarboxylic acid and the like can be used. As aliphatic and alicyclic dicarboxylic acids, succinic acid, adipic acid, sebacic acid, dodecane dioic acid, dimer acid, 1,3-cyclopentane dicarboxylic acid, 1,2-cyclohexane dicarboxylic acid, 1,4-cyclohexane dicarboxylic acid and the like and ester-forming derivatives thereof can be used.

Further, when the laminated layer is formed by using a coating liquid in which the polyester resin (A) and/or (B) is allowed to be an aqueous resin, in order to enhance adhesiveness to polyester film or facilitate solubilization in water of the polyester resin (A) and/or (B), the polyester resin (A) and/or (B) may be copolymerized with a compound having a carboxylic acid base.

As compounds each having a carboxylic acid base, for example, trimellitic acid, trimelliticanhydride, pyromellitic acid, pyromellitic anhydride, 4-methylcyclohexene-1,2,3-tricarboxylic acid, trimesic acid, 1,2,3,4-butane tetracarboxylic acid, 1,2,3,4-pentane tetracarboxylic acid, 3,3',4,4'-benzophenone tetracarbxylic acid, 5-(2,5-dioxotetrahydrofurfuryl)-3-methyl-3-cyclohexene-1,2-dicarboxylic acid, 5-(2,5-dioxotetrahydrofurfuryl)-3-cyclohexene-1,2-dicarboxylic acid, cyclopentane tetracarboxylic acid, 2,3,6,7-naphthalene tetracarboxylic acid, 1,2,5,6-naphthalene tetracarboxylic acid, ethylene glycol bistrimellitate, 2,2',3,3'-diphenyl tetracarboxylic acid, thiophene-2,3,4,5-tetracarboxylic acid, ethylene tetracarboxylic acid and the like, or alkali metal salts, alkali earth metal salts and ammonium salts thereof can be used; however, the present invention is not limited to these compounds.

As diol components of the polyester resins (A) and (B) ethylene glycol, diethylene glycol, polyethylene glycol, propylene glycol, polypropylene glycol, 1,3-propane diol, 1,3-butanediol, 1,4-butanediol, 1,5-pentanediol, 1,6-hexane diol, 1,7-heptane diol, 1,8-octane diol, 1,9-nonane diol, 1,10-decane diol, 2,4-dimethyl-2-ethylhexane-1,3-diol, neopentylglycol, 2-ethyl-2-butyl-1,3-propane diol, 2-ethyl-2-isobutyl-1,3-propane diol, 3-methyl-1,5-pentane diol, 2,2,4-trimethyl-1,6-hexane diol, 1,2-cyclohexane dimethanol, 1,3-cyclohexane dimethanol, 1,4-cyclohexane dimethanol, 2,2,4,4-tetramethyl-1,3-cyclobutane diol, 4,4'-thiodiphenol, bisphenol A, 4,4'-methylene diphenol, 4,4'-(2-norbornylidene)diphenol, 4,4'-dihydroxybiphenol, o-, m- and p-dihydroxybenzene, 4,4'-isopropylidene phenol, 4,4'-isopropylidene bindiol, cyclopentane-1,2-diol, cyclohexane-1,2-diol, cyclohexane-1,4-diol, bisphenol A and the like can be used.

The polyester resin (A) and/or (B) according to the present invention is also capable of using modified polyester copolymers, such as a block copolymer, a graft copolymer and the like which have been modified by an acrylic compound, urethane, epoxy and the like.

Further, so long as effects of the present invention are not impaired, other resins, such as other polyester resins than those to be used in the present invention, a urethane resin, an epoxy resin, a silicone resin, a urea resin, a phenol resin and the like maybe compounded. Still further, so long as effects of the present invention are not impaired, various types of additives such as a cross-linking agent, an antioxidant, a heat-resistant stabilizer, a weather-resistant stabilizer, an ultraviolet ray absorber, an organic easy slipperiness imparting agent, a pigment, a dye, a filler, an antistatic agent, a nucleating agent, a surfactant and the like may be compounded.

The polyester resins (A) and (B) to be used in the laminated layer according to the present invention can be produced by a known production method. For example, it can be produced by a method of directly subjecting a carboxylic acid component and a diol component to an esterification reaction, another method comprising a first step of subjecting these components to an ester exchange reaction and a second step of subjecting the resultant reaction product to a polycondensation reaction, and other appropriate methods. On this occasion, as a reaction catalyst, for example, an alkali metal, an alkali earth metal, manganese, cobalt, zinc, antimony, germanium, a titanium compound and the like are ordinarily used.

Thickness of the laminated layer according to the present invention is preferably from 0.01 $\mu$m to 5 $\mu$m, more preferably from 0.02 $\mu$m to 2 $\mu$m, and still more preferably from 0.05 to 0.5 $\mu$m. When the thickness is unduly small, there may be caused adhesiveness fault, while, when it is unduly large, easy slipperiness or anti-blocking properties may be deteriorated.

When organic or inorganic particles are added in the laminated layer according to the present invention, easy slipperiness or anti-blocking properties are further enhanced; therefore, such an addition is preferable.

Cross-linked polystyrene, a cross-linked acrylic resin, a melamine resin, a benzoguanamine resin and the like are favorably used as organic particles in the laminated layer according to the present invention.

Silica, colloidal silica, beaded silica, alumina, alumina sol, kaolin, talc, mica, calcium carbonate, metal oxide (for example, tin oxide and the like) and the like are preferably used as inorganic particles in the laminated layer according to the present invention.

An average particle diameter of the organic particles and the inorganic particles is preferably from 0.001 μm to 5 μm, more preferably from 0.01 μm to 3 μm, and still more preferably from 0.02 μm to 1 μm.

Further, the beaded silica to be preferably used in the laminated layer according to the present invention, which is colloidal silica that has been interlinked or branched in a beaded state, has a long-chain structure in which spherical colloidal silica are connected with one another in a beaded state (a form in which a plurality of spherical colloidal silica are connected with one another in a chain state), a structure in which the thus-interlinked silica is branched, and/or a structure in which the thus-interlinked silica is bent. The above-described beaded silica is silica in which particle-particle bonds are generated among primary particles of spherical silica by interposing metal ions thereamong whereupon such particles of ordinarily from 3 to less than 100, preferably from 5 to less than 50, and more preferably from 7 to less than 30 are connected with one another; on this occasion, examples of such silica include silica in which the particles which have been connected with one another in a beaded state are, further, branched, and/or silica in which the particles which have been connected with one another in a beaded state are, further, bent. Examples of such interposing metal ions include metal ions having 2 valences or more such as $Ca^{2+}$, $Zn^{2+}$, $Mg^{2+}$, $Ba^{2+}$, $Al^{3+}$, $Ti^{4+}$ and the like. Particularly, $Ca^{2+}$ is preferable in forming colloidal silica connected and branched in a beaded state. Further, a primary particle diameter of the spherical silica is ordinarily from 5 nm to 100 nm, preferably from 8 nm to 80 nm and more preferably from 10 nm to 50 nm; length thereof at the time of being connected in a beaded state is ordinarily from 30 nm to 500 nm and more preferably from 50 nm to 400 nm. As examples of such beaded silica, mentioned is "Snowtex UP" or "Snowtex OUP" manufactured by Nissan Chemical Industries, Ltd.; however, the present invention is not limited to these examples.

It is preferable that the organic or inorganic particles to be contained in the laminated layer according to the present invention satisfy the following relation:

$$0.2 \leq r/d \leq 20$$

wherein r represents an average particle diameter of particles; and d represents an average thickness of the laminated layer.

By allowing the particles to satisfy the above-described relation, easy slipperiness and anti-blocking properties can effectively be imparted to the laminated polyester film according to the present invention. Further, a range of r/d is preferably $1/2 < r/d \leq 20$ and more preferably $1 < r/d \leq 15$, and, in some cases, particles in the range of $1/2 < r/d \leq 4$ are preferably used and those in the range of $1 \leq r/d \leq 4$ are more preferably used.

A quantity of the organic or inorganic particles to be contained in the laminated layer is, based on total weight of the two types of polyester resins having different glass transition points from each other, preferably from 0.05% by weight to 10% by weight, more preferably from 0.1% by weight to 8% by weight and still more preferably from 0.1% by weight to 5% by weight on a solid content ratio basis. When the particle diameter of the above-described particles is unduly large or the quantity of the above-described particles to be contained is unduly large, anti-chipping properties and the like of the laminated layer may be deteriorated.

Further, as particles, two types of particles having different particle diameters from each other, that is, particles (X) which satisfy $2 \leq r_x/d \leq 20$ and particles (Y) which satisfy $0.2 \leq r_y/d \leq 4$ are preferably contained. In such relations, $r_x$ represents an average particle diameter (μm) of the particles (X); $r_y$ represents an average particle diameter (μm) of the particles (Y); and d represents thickness (μm) of the laminated layer. By simultaneously using the two types of particles having different particle diameters from each other, easy slipperiness and anti-blocking properties shown at the time pressure is locally applied can dramatically be enhanced. Particularly, in order to enhance the anti-blocking properties, r/d of the particles (X) preferably satisfies $4 < r_x/d \leq 20$ while r/d of the particles (Y) preferably satisfies $1/2 < r_y/d \leq 4$. Further, more preferable ranges of $r_x/d$ and $r_y/d$ are $4 < r_x/d \leq 20$ and $0.2 \leq r_y/d \leq 4$ respectively, or $2 \leq r_x/d \leq 20$ and $1/2 < r_y/d \leq 4$, respectively; furthermore, still more preferably, r/d of the particles (X) is $4 < r_x/d \leq 20$ while r/d of the particles (Y) is $1/2 < r_y/d \leq 4$. When $r_x/d$ is more than 20, the anti-chipping properties or the anti-blocking properties may be deteriorated while, when $r_y/d$ is less than 0.2, the anti-blocking properties may be deteriorated. A quantity of particles (X) to be contained in the two types of particles, having different particle diameters from each other, which constitute the laminated layer is preferably from 0.05% by weight to 5% by weight, more preferably from 0.1% by weight to 3% by weight, based on the total weight of the two types of polyester resins having different glass transition points from each other of the laminated layer. Further, a quantity of the particles (Y) to be contained is preferably from 0.1% by weight to 10% by weight and more preferably from 0.5% by weight to 8% by weight, based on the total weight of the two types of polyester resins having different glass transition points from each other of the laminated layer. When the quantity of the particles (X) and particles (Y) to be contained are unduly small, the anti-blocking properties maybe deteriorated, while, when the quantity thereof are unduly large, anti-chipping properties and the like of the laminated layer may be deteriorated.

It is preferable that the laminated layer according to the present invention contains an acrylic resin. By containing the acrylic resin, the laminated polyester film can satisfy adhesiveness to various types of resins or the anti-blocking properties shown at the time pressure is locally applied and, further, particularly also can satisfy transparency.

The acrylic resin to be contained in the laminated layer according to the present invention is not particularly limited, but, as a monomer component which constitutes the acrylic resin, usable are, for example, an alkyl acrylate, an alkyl methacrylate, (examples of such alkyl groups include a methyl group, an ethyl group, an n-propyl group, an isopropyl group, an n-butyl group, an isobutyl group, a t-butyl group, a 2-ethylhexyl group, a lauryl group, a stearyl group, a cyclohexyl group, a phenyl group, a benzyl group, a phenylethyl group and the like), a monomer having a hydroxyl group such as 2-hydroxyethyl acrylate, 2-hydroxyethyl methacrylate, 2-hydroxypropyl acrylate, 2-hydroxypropyl methacrylate or the like, a monomer having an amide group such as acrylamide, methacrylamide, N-methyl acrylamide, N-methyl methacrylamide, N-methylol acrylamide, N-methylol methacrylamide, N,N-dimethylol acrylamide, N-methoxymethyl acrylamide, N-methoxymethylmethacrylamide, N-phenyl acrylamide or the like, a monomer having an amino group such as N,N-diethylamino ethyl acrylate, N,N-diethylamino ethyl methacrylate or the like, a monomer having an epoxy group such as glycidyl acrylate, glycidyl methacrylate or the like, a monomer having a carboxylic acid or a salt thereof such as acrylic acid, methacrylic acid or a salt thereof (an alkali metal salt, an alkali earth metal salt, an ammonium salt or the like) and the like whereupon one or more types of these monomer components are copolymerized. Further, these monomer components can be used simultaneously with other types of monomers.

Examples of other types of monomers capable of being used include a monomer having an epoxy group such as an ally glycidyl ether or the like; a monomer having a sulfonic acid group or a salt thereof such as styrene sulfonic acid, vinyl sulfonic acid or a salt thereof (a lithium salt, a sodium salt, a potassium salt, an ammonium salt or the like) or the like; a monomer having a carboxyl group or a salt thereof such as crotonic acid, itaconic acid, maleic acid, fumaric acid or a salt thereof (a lithium salt, a sodium salt, a potassium salt, an ammonium salt or the like) or the like; a monomer having an acid anhydride such as maleic anhydride, itaconic anhydride or the like; vinyl isocyanate; allyl isocyanate; styrene; vinyl methyl ether; vinyl ethyl ether; a vinyl trisalkoxysilane; an alkyl maleic acid monoester; an alkyl fumaric acid monoester; acrylonitrile, methacrylonitrile; an alkyl itaconic acid monoester; vinylidene chloride; vinyl acetate; vinyl chloride; and the like. As a preferable acrylic resin to be used in the present invention, mentioned is a copolymer selected from the group consisting of methyl methacrylate, ethyl methacrylate, methyl acrylate, ethyl acrylate, n-butyl acrylate, 2-hydroxyethyl acrylate, acrylamide, N-methylol acrylamide, acrylic acid and acrylonitrile, or the like. It is preferable from the standpoint of adhesiveness that a molecular weight of each of the above-described acrylic resins is preferably 50,000 or more and more preferably 300,000 or more. Further, as the acrylic resin, it is also possible to simultaneously use two or more types of acrylic resins at a given ratio therebetween.

Further, as the acrylic resin to be contained in the laminated layer according to the present invention, a modified acrylic copolymer, for example, a block copolymer, a graft copolymer or the like which has been modified with polyester, urethane, epoxy or the like can also be used.

A quantity of the acrylic resin to be contained in the laminated layer according to the present invention is, based on the total weight of the two types of polyester resins having different glass transition points, preferably from 0.5% by weight to 8% by weight and more preferably from 1% by weight to 5% by weight on a solid content ratio basis. By containing the acrylic resin therein, the laminated polyester film imparted with adhesiveness to various types of coating materials, anti-blocking properties and, further, transparency at the same time can be provided. Further, when the quantity of the acrylic resin to be contained therein is more than 8% by weight, adhesiveness to, particularly, an oxidative polymerization-type ink, and a water-soluble or hydrophilic resin tends to be deteriorated while, when it is less than 0.5% by weight, the anti-blocking properties or transparency thereof after a heat and humidity treatment tends to be deteriorated.

The glass transition point of the acrylic resin to be contained in the laminated layer according to the present invention is preferably from 0° C. to 100° C., more preferably from 20° C. to 80° C. and still more preferably from 40° C. to 80° C. When the glass transition point of the above-described acrylic resin is unduly low, there may be caused a disadvantage in the anti-blocking properties while, when it is unduly high, there may be caused a problem in stability of the resin at the time it is dispersed in water.

In the present invention, it is preferable from the standpoint of environmental pollution or anti-explosion properties at the time of application that the above-described acrylic resin is dissolved, emulsified or dispersed in water and, used in a state of an aqueous acrylic resin liquid. Such an aqueous acrylic resin can be prepared by a method such as copolymerization with a monomer having a hydrophilic group (acrylic acid, methacrylic acid, acrylamide, vinyl sulfonic acid or a salt thereof, or the like), emulsion polymerization by using a reactive emulsifier or a surfactant, dispersion polymerization, soap-free polymerization or the like.

It is preferable that the laminated layer according to the present invention contains a wax and, by containing the wax, adhesiveness to various types resins and anti-blocking properties as well as, particularly, scratch resistance can be satisfied.

Waxes contained in the laminated layer according to the present invention are not particularly limited, but natural waxes, synthetic waxes, compounded waxes and the like can be used, and two or more types of waxes can also simultaneously be used.

Examples of natural waxes contained in the laminated layer according to the present invention include vegetable-based waxes (for example, candelilla wax, carnauba wax, rice wax, Japan wax, jojoba oil, palm wax, ouricury wax, sugarcane wax, esparto wax, bark wax and the like), animal-based waxes (for example, beeswax, lanolin, spermaceti, Chinese wax, shellac wax, coccus cacti wax, waterfowl wax and the like), mineral waxes, (for example, montan wax, ozokerite, ceresin and like) petroleum waxes (for example, paraffin wax, microcrystalline wax, petrolatum and the like. Examples of synthetic waxes include a synthetic hydrocarbon, a modified wax, a hydrogenated wax, a fatty acid, an acid amide, an ester, a ketone and the like. Further, compounded waxes are waxes which are prepared by compounding the above-described waxes with synthetic resins; on this occasion, a compounding ratio between such a wax and such a synthetic resin is arbitrarily determined.

In the present invention, one or more types of waxes selected from the above-described waxes and wax-based compositions are favorably used but, in view of the anti-blocking properties, petroleum waxes or vegetable waxes are preferably used. Further, a melting point of waxes to be used in the present invention is preferably from 40° C. to 130° C. and more preferably from 60° C. to 100° C.

A quantity of the wax to be contained in the laminated layer is, based on the total weight of the two types of polyester resins having different glass transition points from each other, preferably from 0.5% by weight to 8% by weight and more preferably from 1% by weight to 5% by weight, on a solid content ratio basis. By containing the wax, the laminated polyester film simultaneously having adhesiveness to various types of resins, anti-blocking properties and, further, scratch resistance can be provided. When the quantity of the wax to be contained goes over 8% by weight, adhesiveness thereof tends to be deteriorated, and, when it comes down to less than 0.5% by weight, the anti-blocking properties and the scratch resistance thereof tend to be deteriorated.

By allowing the acrylic resin or the wax component to be contained in the two types of polyester resins constituting the laminated layer according to the present invention and having different glass transition points from each other and, further, the organic or inorganic particles to be added thereto, the easy slipperiness or the anti-blocking properties can be enhanced. On this occasion, two or more types of particles may simultaneously be used and, by such usage, the anti-blocking properties or the easy slipperiness can effectively be enhanced.

In producing the laminated polyester film according to the present invention, a most preferable method for providing the laminated layer is a method in which the laminated layer is applied during a process of preparing the polyester film and, then, stretched together with the base film. For example, the laminated polyester film can be obtained by a method (inline coat method) in which the polyester film in a state before being subjected to crystalline orientation, that has been melt-extruded, is stretched from 2.5 times to 5 times in a longitudinal direction and the resultant monoaxially stretched film is continuously coated with a coating liquid. The thus-coated film is dried by allowing it to pass through a zone which has been heated stepwise and, then, stretched from 2.5 times to 5 times in a width direction therein. Further, the thus-stretched film is continuously introduced in a heating zone having a temperature of from 150° C. to 250° C. to complete the crystalline orientation. On this occasion, from a standpoint of environmental pollution and anti-explosion properties, the coating liquid is preferably water-based.

As a method of application on to the base film, various types of methods, for example, reverse coat method, a gravure coat method, a rod coat method, a bar coat method, a die coat method, a spray coat method and the like can be used.

Next, the method for producing the laminated polyester film according to the present invention is now described in detail by explaining an example in which the base film is polyethylene terephthalate (hereinafter referred to also as "PET" in short), but it should be noted that the present invention is by no means limited thereto.

The laminated polyester film according to the present invention can be produced by providing a laminated layer comprising two types of polyester resins having the above-specified Tg's and different Tg's from each other as principal components on at least one surface of the polyester film.

The method is specifically explained by illustration. Pellets of PET having a limiting viscosity of from 0.5 dl/g to 0.8 dl/g is vacuum-dried, supplied to an extruder, melted at from 260° C. to 300° C., extruded from a T-shaped nozzle in sheet form, wound around a casting drum having a mirror-finished surface whose temperature is maintained at from 10° C. to 60° C., and allowed to be cooled and solidified by using a static electricity applying casting method to produce a non-stretched PET film. The thus-produced non-stretched PET film is stretched from 2.5 times to 5 times in a longitudinal direction (in an advancing direction of the film) by allowing it to pass between rolls heated at from 70° C. to 120° C. At least one surface of this film is subjected to a corona discharge treatment and, then, coated with a laminated layer forming coating liquid according to the present invention. The thus-coated film is introduced in a hot air zone heated at from 70° C. to 150° C. while being held by a clip, dried therein, subsequently stretched from 2.5 times to 5 times in a width direction, subsequently introduced in a heating treatment zone having a temperature of from 160° C. to 250° C. and subjected to the heating treatment for from 1 second to 30 seconds in this order to complete the crystalline orientation. In such a heating treatment process, a treatment for relaxation of from 3% to 12% may optionally be performed in either a width direction or a longitudinal direction. Biaxial stretching may be performed in a longitudinal direction and a transverse direction either successively or simultaneously, or such biaxial stretching may be performed again in either a longitudinal direction or a transverse direction after the biaxial stretching is once performed in longitudinal and transverse directions. The coating liquid to be used on this occasion is preferably water-based in view of the environmental pollution and anti-explosion properties. Further, it is possible to contain a surfactant, a viscosity adjusting agent, an anti-foaming agent or the like in the coating liquid or to use any of them simultaneously with the coating liquid in order to enhance coating properties thereof, so long as any of them does not hurt the effect of the present invention.

The laminated polyester film according to the present invention can be used preferably as a laminated polyester film for a printing application and more preferably as a laminated polyester film for an inkjet printing application by forming a receptive layer on the laminated layer of the laminated polyester film.

The receptive layer to be formed on the laminated layer of the laminated polyester film for the inkjet printing application according to the present invention is a layer which contains an aqueous resin and/or a water-dispersible resin and is not limited in a particular way so long as it absorbs an inkjet ink.

Examples of such aqueous resins and/or water-dispersible resins of the receptive layer to be formed on the laminated layer of the laminated polyester film for the inkjet printing application according to the present invention include methyl cellulose, hydroxyethyl cellulose, carboxyethyl cellulose, hydroxypropyl cellulose, hydroxypropyl ethyl cellulose, cellulose sulfate, sweet potato starch, potato starch, oxidized starch, phosphorylated starch, carboxylated starch, hydroxyethylated starch, cyanoethylated starch, acrylic acid graft starch, dextrin, corn starch, konnyaku, a glue plant, agar, sodium alginate, hibiscus manihot, tragacanth gum, gum Arabic, locust bean gum, guar gum, pectin, carrageenin, glue, gelatin, casein, soybean protein, albumin, completely or partially saponified polyvinyl alcohol and anionic or cationic modifications thereof, polyvinyl alcohol having an acetalized or butyralized degree of 30% or less, polyacrylamide and copolymers thereof, polyvinyl pyrrolidone and copolymers thereof, poly-N-vinyl acetamide and copolymers thereof, polyethylene oxide, ethylene oxide-propylene oxide copolymer, polybutylene oxide, carboxylated polyethylene oxide, polyacrylic acid and a sodium salt thereof, styrene-maleic anhydride copolymer, ethylene-maleic anhydride copolymer and the like; however, the present invention is by no means limited to these examples. One type or two or more types of these aqueous resins or water-dispersible resins may be mixed to the receptive layer.

Further, the receptive layer to be formed on the laminated layer of the laminated polyester film for the inkjet printing application according to the present invention can optionally be added with a cationic substance or particles, or a cross-linking agent. By such an addition, ink absorptive properties or adsorptive properties, color forming properties or the like can be enhanced; hence, such an addition is preferable.

Cationic substances to be added to the receptive layer are not particularly limited; however, preferable is a cationic substance which has an quaternary ammonium salt and uses a chloride, a sulfate, a nitrate or the like in a composition thereof as a counter ion; on this occasion, a cationic surfactant, a polymer having a cationic group can be adopted.

Particles to be added to the receptive layer are not particularly limited; however, silica, colloidal silica, alumina, alumina sol, zeolite, titanium oxide, kaolin, kaolinite, talc, mica, calcium carbonate and the like can be used.

Cross-linking agents to be used in the receptive layer are not particularly limited; however, a methylol-modified or an alkylol-modified urea, a melamine-type, an acrylamide-type or a polyamide-type resin, an epoxy compound, an isocyanate compound, an oxazoline-type compound, an aziridine compound, various types of silane coupling agents, various types of titanate-type coupling agents and the like can be used.

Further, in the receptive layer, various types of additives, such as an antioxidant, a heat-resistant stabilizer, a weather-resistant stabilizer, an ultraviolet ray abosorber, an easy slipperiness imparting agent, a pigment, a dye, organic or inorganic fine particles, a filler, an antistatic agent, a nucleating agent and the like may be compounded.

Furthermore, thickness of the receptive layer is not particularly limited; however, it is ordinarily from 5 $\mu$m to 100 $\mu$m and preferably from 10 $\mu$m to 50 $\mu$m. When the receptive layer is unduly thin, ink absorption properties, image developing properties or the like may sometimes be deteriorated. On the other hand, when the receptive layer is unduly thick, a drying speed may sometimes be low whereupon a production efficiency may sometimes be deteriorated.

The receptive layer to be formed on the laminated layer of the laminated polyester film for the inkjet printing application according to the present invention is formed by a method in which a receptive layer forming coating liquid is coated on the laminated layer by using a coating apparatus and, then, dried. Examples of coating methods to be usable include a blade coat method, an air knife method, a roll coat method, a brush coat method, a gravure coat method, a kiss coat method, an extrusion method, a slide hopper (slide bead) method, a curtain coat method, a spray coat method and the like.

The laminated polyester film according to the present invention can preferably be used as a laminated polyester film for a pressure-sensitive adhesive label application.

The laminated polyester film for the pressure-sensitive adhesive label application according to the present invention can be used as a pressure-sensitive adhesive label after a printing layer is provided at least partially on the laminated layer thereof and a tackifier layer is provided on a side thereof on which the printing layer is not provided.

When the laminated polyester film for the pressure-sensitive adhesive label application according to the present invention is used as a pressure-sensitive adhesive label, a printing layer is provided at least partially on the laminated layer.

The printing layer to be provided on the laminated layer is not particularly limited so long as it has an indication function. A method of printing the above-described printing layer is not particularly limited; however, ordinarily, methods of, for example, offset printing, screen printing, gravure printing and the like can be used. Further, printing ink to be used in these methods is selected depending on a printing method and is not particularly limited; however, a UV-curable ink, an electron beam-curable ink, an oxidative polymerization-type ink, a solvent-based ink (flexo ink, screen ink or the like), an aqueous ink (flexo ink or the like) or the like can be used.

When the laminated polyester film for the pressure-sensitive adhesive label application according to the present invention is used as a pressure-sensitive adhesive label, a tackifier layer to be provided on the laminated polyester film for the pressure-sensitive adhesive label application is not limited to any particular composition so long as it has tacky characteristics; however, it is roughly grouped to a rubber type, an acrylic type, a vinyl type, a silicone type and the like. Among these types, the rubber type and the acrylic type are preferable for the pressure-sensitive adhesive label application.

Such a rubber-type tackifier to be used when the laminated polyester film for the pressure-sensitive adhesive label application according to the present invention is used as the pressure-sensitive adhesive label ordinarily contains a rubber elastomer, a softening agent and a tackiness imparting agent as principal components and is optionally added with a filler and an anti-aging agent.

Examples of rubber elastomers to be usable include natural rubber, styrene-butadiene rubber, butyl rubber, polyisobutylene, butadiene, a styrene-isopropylene block copolymer, a styrene-butadiene block copolymer, reclaimed rubber and the like.

Examples of resins to be usable as the tackiness imparting agents include rosins and derivatives thereof, gum rosins, terpene resins, petroleum resins, oil-soluble phenol resins and the like; further, in order to impart the tackifier with wetting properties to coating materials, polybutene, liquid rubber, a phthalic acid-type plasticizer, mineral oil and the like can be added thereto.

Examples of softening agents to be usable include mineral oil, liquid polybutene, liquid polyacrylate, lanolin and the like.

Examples of usable fillers which are optionally added include zinc oxide, hydrated aluminum, titanium oxide, calcium carbonate, clay, pigments and the like; further, examples of anti-aging agents to be usable include anti-aging agents for rubber applications, dithiocarbamate, metal chelating agents and the like.

On the other hand, acrylic tackifier comprises an acrylic acid ester such as butyl acrylate, acrylic acid-2-ethylhexyl or the like as a principal component; on this occasion, such resins are unduly soft as they are whereupon the resins can be used after allowing them to be copolymerized with a monomer for adjusting cohesion force such as vinyl acetate, ethylene-acrylic acid, methyl acrylate, a methacrylic acid alkyl ester or the like. Other additives are same as in the above-described rubber-type tackifier, that is, tackiness imparting agents, softening agents, fillers and the like.

In the case of the acrylic tackifier, in order to enhance heat resistance and oil resistance, a functional monomer having a carboxylic acid, a hydroxyl group, an acid amide or the like can be introduced thereto to allow it to be of a cross-linked type. As a cross-linking agent to be used for allowing it to be of the cross-linked type, diisocyanate, melamine or the like can be used. A silicone-type tackifier which comprises a mixture of siloxane in a rubber state and a polymer of siloxane in a resin state as a principal component can be used whereupon the silicone-type tackifier has characteristics that it can have tackiness to Teflon or silicone rubber which are intrinsically hard to be adhered.

A vinyl-type tackifier which comprises a vinyl chloride-vinyl acetate copolymer, polyvinyl butyral, polyvinyl ether or the like as a principal component can be used. As application methods of the tackifier, there are a direct method in which the tackifier is directly applied on a surface base material and, then, laminated with a releasing paper and an indirect method in which the tackifier is applied on a silicone coated surface of a releasing paper and, then, the surface base material is laminated thereto, and the like.

The application methods of the tackifier are not particularly limited but those using a doctor coater, a comma coater, a kiss roll coater, a reverse roll coater and the like can be used.

Measuring methods of characteristics and evaluation methods of effects are described below.

The measuring methods of characteristics and the evaluation methods of effects according to the present invention are described below.

(1) Glass Transition Point (Tg)

A glass transition point (Tg) was measured by using Robot DSC (differential scanning calorimeter) RDC 220 (manufactured by Seiko Instruments & Electronics Ltd.) connected with SSC5200 disk station (manufactured by Seiko Instruments & Electronics Ltd.). After holding a sample of 10 mg is prepared in an aluminum pan, it was set in the DSC apparatus (reference: an aluminum pan of same type without being prepared with a sample), heated at 300° C. for 5 minutes and, then, rapidly cooled in a liquid nitrogen atmosphere. The thus-cooled sample was heated at a heating speed of 10° C./minute to obtain a DSC chart and, from the thus-obtained DSC chart, the glass transition point (Tg) was determined.

(2) Thickness of Laminated Layer

By using transmission electron microscope Model HU-12 (manufactured by Hitachi, Ltd.), a photograph observing a cross-section of a laminated polyester film provided with a laminated layer was obtained and, then, from the thus-obtained photograph, thickness of the laminated layer was determined. On this occasion, the thickness was determined as an average of those obtained at 30 points in a viewing field of measurements.

(3) Average Particle Diameter of Particles

An average of particle diameters of 50 particles (Examples 1 to 9, 44 to 49, 50 to 54 and 55 to 57; Comparative Examples. 1 to 5, 23 to 27 and 28 to 32; Tables 1, 5, 6 and 7) or 2.0 particles (Examples 10 to 19, 20 to 31 and 32 to 43; Comparative Examples 6 to 12, 13 to 17, and 18 to 22; Tables 2, 3 and 4) observed when a surface of the laminated layer of the laminated polyester film was observed by using scanning electron microscope Model S-2100A (manufactured by Hitachi, Ltd.) with a magnification power of 10,000 was defined as an average particle diameter.

(4) Adhesiveness-1

Bestcure 161 Black (manufactured by T&K Toka Co., Ltd.), as a UV-curable ink, was coated on the laminated layer by using a roll coat method in a thickness of about 1.5 µm. Thereafter, the thus-coated Bestcure was irradiated by using a UV lamp having an irradiation intensity of 80 W/cm for 5 seconds at a distance (distance between the lamp and an ink surface) of 12 cm. After the resultant ink cured layer was left to stand for one day at 23° C. and 65% RH for adjustment of a moisture content thereof, it was crosscut to allow it to be divided into 100 pieces each having an area of 1 mm². Thereafter, a cellophane tape manufactured by Nichiban Co., Ltd. was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the ink-cured layer (○○: 100; ○: 80 to 99; Δ: 50 to 79; and X: 0 to 49). On this occasion, "○○" and "○" were rated as good adhesiveness.

(5) Adhesiveness-2

A 10% aqueous solution of polyvinyl alcohol resin (trade name: Gohsenol GH-23; manufactured by The Nippon Synthetic Chemical Industry Co., Ltd.) was coated on the laminated layer by using a gravure coater in a coating thickness of about 7 µm on a dry basis and, then, dried at 120° C. After the resultant polyvinyl alcohol resin layer was left to stand for one day at 23° C. and 65% RH for adjustment of a moisture content thereof, it was crosscut to allow it to be divided into 100 pieces each having an area of 1 mm². Thereafter, a cellophane tape was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the polyvinyl alcohol resin layer (○: 80 to 100; Δ: 50 to 79; and X: 0 to 49). On this occasion, "○" was rated as good adhesiveness.

(6) Adhesiveness-3

Daicure RT-8 Black (manufactured by Dainippon Ink and Chemicals, Inc.), as a UV-curable ink, was coated on the laminated layer by using a roll coat method in a thickness of about 1.5 µm. Thereafter, the thus-coated Daicure was irradiated by using a UV lamp having an irradiation intensity of 120 W/cm for 5 seconds at a distance (distance between the lamp and an ink surface) of 12 cm to form a printing layer. After the thus-formed printing layer was left to stand for one day at 23° C. and 65% RH for adjustment of a moisture content thereof, it was crosscut to allow it to be divided into 100 pieces each having an area of 1 mm². Thereafter, a cellophane tape manufactured by Nichiban Co., Ltd. was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the printing layer (○○: 100; ○: 80 to 99; Δ: 50 to 79; and X: 0 to 49). On this occasion, "○○" and "○" were rated as good adhesiveness.

(7) Adhesiveness-4

A 10% aqueous solution of polyvinyl alcohol resin (trade name: PVA-117; manufactured by Kraray Co., Ltd.) was coated on the laminated layer by using a gravure coater in a coating thickness of about 7 µm on a dry basis and, then, dried at 120° C. After the resultant polyvinyl alcohol resin layer was left to stand for one day at 23° C. and 65% RH for adjustment of a moisture content thereof, it was crosscut to allow it to be divided into 100 pieces each having an area of 1 mm². Thereafter, a cellophane tape was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the polyvinyl alcohol layer (○: 80 to 100; Δ: 50 to 79; and X: 0 to 49). On this occasion, "○" was rated as good adhesiveness.

(8) Adhesiveness-5

HS-OS Black (manufactured by Kuboi Ink Co., Ltd.), as an oxidative polymerization-type ink, was coated on the laminated layer by using a roll coat method in a thickness of about 1.5 µm. Thereafter, the thus-coated HS-OS Black was cured at 23° C. and 65% RH to form a printing layer. Then, the thus-formed printing layer was crosscut to allow it to be divided into 100 pieces each having an area of 1 mm². Thereafter, a cellophane tape manufactured by Nichiban Co., Ltd. was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the printing layer (◯◯: 100; ◯: 80 to 99; Δ: 50 to 79; and X: 0 to 49). On this occasion, "◯◯" and "◯" were rated as good adhesiveness.

(9) Adhesiveness-6

A 10% aqueous solution of polyvinyl alcohol resin (trade name: "Gohsenol" GH-23; manufactured by The Nippon Synthetic Chemical Industry Co., Ltd.) was coated on the laminated layer by using a gravure coater in a coating thickness of about 7 μm on a dry basis and, then, dried at 100° C. After the resultant polyvinyl alcohol resin layer was left to stand for one day at 23° C. and 65% RH for adjustment of a moisture content thereof, it was crosscut to allow it to be divided into 100 pieces each having an area of 1 mm². Thereafter, a cellophane tape was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the polyvinyl alcohol layer (◯: 80 to 100; Δ: 50 to 79; and X: 0 to 49). On this occasion, "◯" was rated as good adhesiveness.

(10) Adhesiveness-7

"Bestcure" 161 Black (manufactured by T&K Toka Co., Ltd.) as a UV-curable ink, was coated on the laminated layer by using a roll coat method in a thickness of about 1.5 μm. Thereafter, the thus-coated "Bestcure" was irradiated by using a UV lamp (one lamp) having an irradiation intensity of 80 W/cm at an irradiation speed of 25 m/minute at a distance (distance between the lamp and an ink surface) of 12 cm to form a printing layer. After the thus-formed printing layer was left to stand for one day at 23° C. and 65% RH for adjustment of a moisture content thereof, it was crosscut to allow it to be divided into 100 pieces each having an area of 1 mm². Thereafter, a cellophane tape manufactured by Nichiban Co., Ltd. was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the printing layer (◯◯: 100; ◯: 80 to 99; Δ: 50 to 79; and X: 0 to 49). On this occasion, "◯◯" and "◯" were rated as good adhesiveness.

(11) Adhesiveness-8

A 10% aqueous solution of polyvinyl alcohol resin (trade name: "Gohsenol" GH-23; manufactured by The Nippon Synthetic Chemical Industry Co., Ltd.) was coated on the laminated layer by using a gravure coater in a coating thickness of about 5 μm on a dry basis and, then, dried at 80° C. After the resultant polyvinyl alcohol resin layer was left to stand for one day at 23° C. and 65% RH for adjustment of a moisture content thereof, it was crosscut to allow it to be divided into 100 pieces each having an area of 1 mm². Thereafter, a cellophane tape was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the polyvinyl alcohol layer (◯: 80 to 100; Δ: 50 to 79; and X: 0 to 49). On this occasion, "◯" was rated as good adhesiveness.

(12) Adhesiveness-9

An aqueous solution of NS-141LX manufactured by Takamatsu Oil & Fat Co., Ltd./JURYMER SPO202 manufactured by Nihon Junyaku Co., Ltd. (at a ratio pf 75/25 parts by weight), as a receptive layer forming coating liquid, was coated on the laminated layer of the laminated polyester film by using a gravure coater in a coating thickness of about 10 μm on a dry basis and, then, dried at 120° C. to form a receptive layer. After the thus-formed receptive layer was left to stand for one day at 23° C. and 65% RH for adjustment of a moisture content thereof, it was crosscut to allow it to be divided into 100 pieces each having an area of 1 mm². Thereafter, a cellophane tape was attached thereon, pressed by using a rubber roller (with a load of 19.6 N 5 times on a reciprocating basis) and, then, peeled off in a direction of 90 degrees.

The adhesiveness was evaluated in accordance with a number of remaining thus-crosscut pieces of such ink receptive layer (◯: 75 to 100; Δ: 50 to 74; and X: 0 to 49). On this occasion, "◯" was rated as good adhesiveness.

(13) Adhesiveness-10

A receptive layer was provided on the laminated polyester film in a same manner as in the above-described (12) and left to stand for one day at 23° C. and 65% RH for adjustment of a moisture content thereof. Thereafter, a solid printing was performed on the receptive layer by using an inkjet printer (tradename: PM-750C; manufactured by Seiko Epson Corporation) After the resultant receptive layer was further left to stand for one day at 23° C. and 65% RH for adjustment of a moisture content thereof, it was crosscut to allow it to be divided into 100 pieces each having an area of mm². Thereafter, a cellophane tape was attached thereon, pressed by using a rubber roller (with a load of 19.6 N 5 times on a reciprocating basis) and, then, peeled off in a direction of 90 degrees.

The adhesiveness was evaluated in accordance with a number of remaining thus-crosscut pieces of the receptive layer (◯: 75 to 100; Δ: 50 to 74; and X: 0 to 49). On this occasion, "◯" was rated as good adhesiveness.

(14) Adhesiveness-11

UV Ace-super Black (manufactured by Kuboi Ink Co., Ltd.) as a UV-curable ink, was coated on the laminated layer by using a roll coat method in a thickness of about 1.5 μm. Thereafter, the thus-coated UV Ace-super Black was irradiated by using a UV lamp having an irradiation intensity of 80 W/cm for 5 seconds at a distance (distance between the lamp and an ink surface) of 12 cm to form a printing layer. After the thus-formed printing layer was left to stand for one day at 23° C. and 65% RH for adjustment of a moisture content thereof, it was crosscut to allow it to be divided into 100 pieces each having an area of 1 mm². Thereafter, a cellophane tape manufactured by Nichiban Co., Ltd. was attached thereon, pressed by using a rubber roller (with a load of 20 N 3 times on a reciprocating basis) and, then, peeled off in a direction of 90 degrees.

The adhesiveness was evaluated in accordance with a number of remaining thus-crosscut pieces of the printing layer (◯◯: 100; ◯: 80 to 99; Δ: 50 to 79; and X: 0 to 49). On this occasion, "◯◯" and "◯" were rated as good adhesiveness.

(15) Adhesiveness-12

Tetoron 990 Black (manufactured by Jujo Chemical Co., Ltd.), as a solvent-type ink, was diluted by a Tetoron standard solvent and, then, coated on the laminated layer in a thickness of about 8 μm on a dry basis and dried at 60° C. to form a printing layer thereon. After the thus-formed printing layer was left to stand for one day at 23° C. and 65% RH for adjustment of a moisture content thereof, it was crosscut to allow it to be divided into 100 pieces each having an area of 1 mm². A cellophane tape was attached thereon, pressed by using a rubber roller (under a load of 20 N 3 times on a reciprocating basis) and peeled off in a direction of 90 degrees.

The adhesiveness was evaluated in accordance with a number of remaining thus-crosscut pieces of the printing layer (◯: 80 to 100; Δ: 50 to 79; and X: 0 to 49). On this occasion, "◯" was rated as good adhesiveness.

(16) Adhesiveness-13

After a reclaimed laminated polyester film was left to stand for one day at 60° C. and 80% RH for adjustment of a moisture content thereof, it was crosscut to allow it to be divided into 100 pieces each having an area of 1 mm$^2$. A cellophane tape manufacture by Nichiban Co., Ltd. was attached thereon, pressed by using a rubber roller (under a load of 20 N 3 times on a reciprocating basis) and peeled off in a direction of 90 degrees.

The adhesiveness was evaluated in accordance with a number of remaining thus-crosscut pieces of the laminated layer (◯: 80 to 100; Δ: 50 to 79; and X: 0 to 49). On this occasion, "◯" was rated as good adhesiveness.

(17) Anti-blocking properties-1

Laminated layers were overlapped with each other and, then, were left to stand for 24 hours under a load (500 g/(3×4)cm$^2$) at 40° C. and 90% RH for adjustment of a moisture contents thereof and, thereafter, a peeling state of a part thereof on which the load was applied was evaluated in accordance with the following references: ◯◯: overlapped laminated layers are easily separated from each other and no overlapping mark remains thereon; ◯: overlapped laminated layers are easily separated from each other, but an overlapping mark remains thereon; Δ: overlapped laminated layers can be separated from each other, but an overlapping mark remains thereon; and X: when overlapped laminated layers are separated from each other, they are torn open. On this occasion, "◯◯" and "◯" were rated as acceptable.

(18) Anti-blocking Properties-2

Laminated layers are overlapped with each other and, then, 3 supporting points (one supporting point is allowed to be a circle having a diameter of 1 cm which contacts a laminated layer) were selected in the thus-overlapped laminated layers. While a load of 5 kg was applied on the 3 supporting points, the overlapped laminated layers were left to stand for 48 hours at 23° C. and 65% RH for adjustment of a moisture contents thereof and, then, a peeling state of a part thereof on which the load was applied was evaluated in accordance with the following references: ◯◯: overlapped laminated layers are easily separated from each other and no overlapping mark remains thereon; ◯: overlapped laminated layers are easily separated from each other, but an overlapping mark partially remains thereon; Δ: overlapped laminated layers can be separated from each other, but an overlapping mark remains thereon; and X: when overlapped laminated layers are separated from each other, they are torn open. On this occasion, "◯◯" and "◯" were rated as acceptable.

(19) Anti-blocking Properties-3

Laminated layers were overlapped with each other and clipped by a binder clip (Model: No. 155, large size; manufactured by Lion Office Products Corporation) thereby locally applying a load and, then, left to stand for 36 hours at 23° C. and 65% RH for adjustment of a moisture content thereof and, thereafter, a peeling state of a part thereof on which the load was applied was evaluated in accordance with the following references: ◯◯: overlapped laminated layers are easily separated from each other and no overlapping mark remains thereon; ◯: overlapped laminated layers are easily separated from each other, but an overlapping mark partially remains thereon; Δ: overlapped laminated layers can be separated from each other, but an overlapping mark remains thereon; and X: when overlapped laminated layers are separated from each other, they are torn open. On this occasion, ◯◯ and ◯ were rated as acceptable.

(20) Anti-blocking Properties-4

Laminated layers are overlapped with each other and, while a load (5 kg/(3×4) cm$^2$) was applied on the thus-overlapped laminated layers, the overlapped laminated layers were left to stand for 48 hours at 40° C. and 90% RH for adjustment of a moisture contents thereof and, then, a peeling state of a part thereof on which the load was applied was evaluated in accordance with the following references: ◯◯: overlapped laminated layers are easily separated from each other and no overlapping mark remains thereon; ◯: overlapped laminated layers are easily separated from each other, but an overlapping mark partially remains thereon; Δ: overlapped laminated layers can be separated from each other, but an overlapping mark remains thereon; and X: when overlapped laminated layers are separated from each other, they are torn open. On this occasion, "◯◯" and "◯" were rated as acceptable.

(21) Anti-blocking Properties-5

A receptive layer was provided on the laminated polyester film in a same manner as in the above-described (12) and left to stand for one day at 23° C. and 65% RH for adjustment of a moisture content thereof. Thereafter, a receptive layer surface and a polyester film "Lumirror" T60 (manufactured by Toray Industries, Inc.) were overlapped with each other and, while a load (500 g/(3×4) cm$^2$) was applied on the receptive layer thus overlapped with the polyester film, it was left to stand for 24 hours at 40° C. and 90% RH for adjustment of a moisture contents thereof and, then, a peeling state of a part thereof on which the load was applied was evaluated in accordance with the following references: ◯◯: overlapped receptive layer and polyester film are easily separated from each other and no overlapping mark remains thereon; ◯: overlapped receptive layer and polyester film are easily separated from each other, but an overlapping mark partially remains thereon; Δ: overlapped receptive layer and polyester film can be separated from each other, but an overlapping mark remains thereon; and X: when overlapped receptive layer and polyester film are separated from each other, they are torn open. On this occasion, "◯◯" and "◯" were rated as acceptable.

(22) Anti-blocking Properties-6

A printing layer formed in a same manner as in the above-described (14) and the polyester film "Lumirror" T60 (manufactured by Toray Industries, Inc.) were overlapped with each other and, while a load (500 g/(3×4) cm$^2$ was applied on the polyester film thus overlapped with the printing layer, it was left to stand for 24 hours at 40° C. and 90% RH for adjustment of a moisture content thereof and, then, a peeling state of a part thereof on which the load was applied was evaluated in accordance with the following references: ◯◯: overlapped printing layer and polyester film are easily separated from each other and no overlapping mark remains thereon; ◯: overlapped printing layer and polyester film are easily separated from each other, but an overlapping mark partially remains thereon; Δ: overlapped printing layer and polyester film can be separated from each other, but an overlapping mark remains thereon; and X: when overlapped printing layer and polyester film are separated from each other, they are torn open. On this occasion, "◯◯" and "◯" were rated as acceptable.

(23) Transparency

After the laminated polyester film was left to stand for one week at 40° C. and 90% RH for adjustment of a moisture content thereof, a haze value thereof was measured by using a full automatic direct-reading haze computer HGM-2DP (for C light source) (manufactured by Suga Test Instruments Co., Ltd.) and the transparency was indicated as an average of measurements conducted at 10 points. At this occasion, a haze value of 1.5 or less of the film when it was in a thickness of 50 μm was defined as being good.

Haze value:

$H(\%) = (Td/Tt) \times 100$ $Td(\%) = [\{T4 - T3 \times (T2/T1)\}/T1] \times 100$ (diffuse transmittance)

$Tt(\%) = (T3/T1) \times 100$ (entire light ray transmittance), wherein T1: incident light ray; T2: entire transmitted light rays; T3: diffused light of apparatus; and T4: duffused transmitted light.

(24) Scratch Resistance

A surface of the laminated layer was applied with a load in the range of from 400 g to 600 g and easiness of being scraped by a nail was evaluated by an eye observation; on this occasion, the laminated layer which was not scraped was rated as good.

(25) Foreign Matters

In regard to the reclaimed laminated polyester film having a size of 100 mm×100 mm, foreign matters which were shown in white by using a deflecting system were observed by a stereoscopic microscope whereupon a number of the foreign matters having a size of 100 μm or more was counted. The number of foreign matters was converted to the number thereof per 1000 cm² and, then, the thus-converted number was evaluated in accordance with the following references whereupon "○" and "Δ" were rated as a good level: ○: the number of the foreign matters is 15 or less; Δ: the number of the foreign matters is from 16 to 25; and X: the number of the foreign matters is 26 or more.

(26) Discoloration Extent

Taking the laminated polyester film as a blank film, a discoloration extent of a reclaimed polyester film was compare d therewith on a same base thickness basis and a discoloration extent was subjected to a three-stage evaluation whereupon "○" and "Δ" were rated as a good level, wherein ○: hardly different from the blank film; Δ: slightly discolored; and X: heavily discolored.

The present invention is now explained with reference to embodiments, however, the present invention is by no means limited to these embodiments.

EXAMPLE 1

PET (polyethylene terephthalate) pellets (limiting viscosity: 0.63 dl/g) containing 0.015% by weight of colloidal silica having an average particle diameter of 0.4 μm and 0.005% by weight of colloidal silica having an average particle diameter of 1.5 μm were sufficiently vacuum-dried, supplied to an extruder, melted at 285° C. therein, extruded through a T-shaped nozzle thereof in a sheet-like form and wound around a casting drum having a mirror-finished surface whose temperature is held at 25° C. by means of a static electricity applying casting method and allowed to be cooled and solidified. The resultant non-stretched film was heated to 85° C., and stretched 3.3 times in a longitudinal direction to form a monoaxially oriented film. The thus-formed film was subjected to a corona discharge treatment in air and applied with a laminated layer forming coating liquid held at 25° C. While the thus-applied monoaxially oriented film was clipped with a clip, it was introduced into a preheating zone of a tenter, dried at 90° C. therein, subsequently introduced into a heating zone thereof held at 100° C., continuously stretched in a width direction 3.3 times therein, and further subjected to a heating treatment in the heating zone held at 225° C. to obtain a laminated polyester film in which crystalline orientation has been completed. On this occasion, thickness of the base PET film and that of the laminated layer were 50 μm and 0.08 μm, respectively.

The laminated layer forming coating liquid used in this case was in a relation of a1/b1=50/50 (in a weight ratio of solid contents). Results are shown in Table 1.

EXAMPLE 2

Except that the laminated layer forming coating liquid of Example 1 was allowed to be in a relation that a1/b1=70/30 (in a weight ratio of solid contents), the laminated PET film was obtained in a same manner as in Example 1. Results are shown in Table 1.

EXAMPLE 3

Except that the laminated layer forming coating liquid of Example 1 was allowed to be in a relation that a1/b2=50/50 (in a weight ratio of solid contents), the laminated PET film was obtained in a same manner as in Example 1. Results are shown in Table 1.

EXAMPLE 4

Except that the laminated layer forming coating liquid of Example 1 was allowed in a relation that a2/b5=50/50 (in a weight ratio of solid contents), the laminated PET film was obtained in a same manner as in Example 1. Results are shown in Table 1.

EXAMPLE 5

Except that the laminated layer forming coating liquid of Example 1 was allowed to be in a relation that a2/b6=50/50 (in a weight ratio of solid contents), the laminated PET film was obtained in a same manner as in Example 1. Results are shown in Table 1.

EXAMPLE 6

Except that the laminated layer forming coating liquid of Example 1 was allowed to be in a relation that a2/b7=50/50 (in a weight ratio of solid contents), the laminated PET film was obtained in a same manner as in Example 1. Results are shown in Table 1.

EXAMPLE 7

PET pellets (limiting viscosity: 0.63 dl/g) containing 14% by weight of titanium dioxide having an average particle diameter of 0.2 μm and 0.5% by weight of silica having an average particle diameter of 1 μm were sufficiently vacuum-dried, supplied to an extruder, melted at 285° C. therein, extruded through a T-shaped nozzle thereof in a sheet-like form, wound around a casting drum having a mirror-finished surface whose temperature was held at 25° C. by means of a static electricity applying casting method and allowed to be cooled and solidified. The resultant non-stretched film was heated to 85° C., and stretched 3.3 times in a longitudinal direction to form a monoaxially oriented film. The thus-formed film was subjected to a corona discharge treatment in air and, then, the thus-treated surface thereof was applied with a same laminated layer forming coating liquid as in Example 1. While the thus-applied monoaxially oriented film was clipped with a clip, it was introduced into a preheating zone of a tenter, dried at 95° C. therein, subsequently introduced into a heating zone thereof held at 110° C., continuously stretched 3.3 times in a width direction therein, and further subjected to a heating treatment in the heating zone held at 210° C. to obtain a white laminated PET film provided with a laminated layer in which crystalline orientation has been completed. On this occasion, thickness, optical density, and whiteness of such PET film in which a base material is white were 50 µm, 1.5 and 85%, respectively, and, further thickness of the laminated layer was 0.08 µm.

The laminated layer forming coating liquid used in this case was in a relation that a1/b1=50/50 (in a weight ratio of solid contents). Results are shown in Table 1.

COMPARATIVE EXAMPLE 1

Except that the laminated layer forming coating liquid of Example 1 was allowed to be in a relation that a1/b3=50/50 (in a weight ratio of solid contents), the laminated PET film was obtained in a same manner as in Example 1. Results are shown in Table 1.

COMPARATIVE EXAMPLE 2

Except that the laminated layer forming coating liquid of Example 1 was allowed to be in a relation that a1/b4=50/50 (in a weight ratio of solid contents), the laminated PET film was obtained in a same manner as in Example 1. Results are shown in Table 1.

COMPARATIVE EXAMPLE 3

Except that the laminated layer forming coating liquid of Example 1 was allowed to be in a relation that b1/b2=50/50 (in a weight ratio of solid contents), the laminated PET film was obtained in a same manner as in Example 1. Results are shown in Table 1.

COMPARATIVE EXAMPLE 4

Except that only a1 was used in the laminated layer forming coating liquid of Example 1, the laminated PET film was obtained in a same manner as in Example 1. Results are shown in Table 1.

COMPARATIVE EXAMPLE 5

Except that only b1 was used in the laminated layer forming coating liquid of Example 1, the laminated PET film was obtained in a same manner as in Example 1. Results are shown in Table 1.

EXAMPLE 8

Except that 0.3% by weight (based on a total weight of polyester resins a1 and b1) of colloidal silica (particle diameter: 0.3 µm) was added in the laminated layer forming coating liquid of Example 1, the laminated PET film was obtained in a same manner as in Example 1. Thickness of the laminated layer was 0.08 µm. Results are shown in Table 1.

EXAMPLE 9

Except that 3% by weight (based on a total weight of polyester resins a1 and b1) of colloidal silica (particle diameter: 0.08 µm) was added in the laminated layer forming coating liquid of Example 1, the laminated PET film was obtained in a same manner as in Example 1. Thickness of the laminated layer was 0.08 µm. Results are shown in Table 1.

TABLE 1

| | | Polyester (A) | | | Polyester (B) | | | | | Particles | | Adhesiveness | | Anti-blocking properties |
|---|---|---|---|---|---|---|---|---|---|---|---|---|---|---|
| | | Tg (° C.) | Sa (% by mol) | TPA (% by mol) | | Tg (° C.) | Sb (% by mol) | IPA (% by mol) | DEG (% by mol) | Mixing ratio A/B | r/d | Quantity (% by weight) | 1 | 2 | 1 |
| Example 1 | a1 | 80 | 12 | 88 | b1 | 18 | 7 | 93 | 90 | 50/50 | — | — | ⊚ | ○ | ○ |
| Example 2 | a1 | 80 | 12 | 88 | b1 | 18 | 7 | 93 | 90 | 70/30 | — | — | ⊚ | ○ | ○ |
| Example 3 | a1 | 80 | 12 | 88 | b2 | 38 | 9 | 91 | 80 | 50/50 | — | — | ⊚ | ○ | ○ |
| Example 4 | a2 | 78 | 15 | 85 | b5 | 40 | 10 | 60 | 80 | 50/50 | — | — | ⊚ | ○ | ○ |
| Example 5 | a2 | 78 | 15 | 85 | b6 | 45 | 9 | 91 | 40 | 50/50 | — | — | ○ | ○ | ○ |
| Example 6 | a2 | 78 | 15 | 85 | b7 | 47 | 10 | 45 | 80 | 50/50 | — | — | ○ | ○ | ○ |
| Example 7 | a1 | 80 | 12 | 88 | b1 | 18 | 7 | 93 | 90 | 50/50 | — | — | ⊚ | ○ | ○ |
| Comp. Ex. 1 | a1 | 80 | 12 | 88 | b3 | 35 | 0 | 65 | 0 | 50/50 | — | — | ○ | △ | △ |
| Comp. Ex. 2 | a1 | 80 | 12 | 88 | b4 | 45 | 15 | 0 | 20 | 50/50 | — | — | X | ○ | ○ |
| Comp. Ex. 3 | b2 | 38 | 9 | 0 | b1 | 18 | 7 | 93 | 90 | 50/50 | — | — | ⊚ | ○ | X |
| Comp. Ex. 4 | a1 | 80 | 12 | 88 | — | — | — | — | — | 100/0 | — | — | X | ○ | ○ |
| Comp. Ex. 5 | — | — | — | — | b1 | 18 | 7 | 93 | 90 | 0/100 | — | — | ⊚ | ○ | X |
| Example 8 | a1 | 80 | 12 | 88 | b1 | 18 | 7 | 93 | 90 | 50/50 | 3.8 | 0.3 | ⊚ | ○ | ⊚ |
| Example 9 | a1 | 80 | 12 | 88 | b1 | 18 | 7 | 93 | 90 | 50/50 | 1 | 3 | ⊚ | ○ | ⊚ |

EXAMPLE 10

PET pellets (limiting viscosity: 0.63 dl/g) containing 0.015% by weight of colloidal silica having an average particle diameter of 0.4 μm and 0.005% by weight of colloidal silica having an average particle diameter of 1.5 μm were vacuum-dried, supplied to an extruder, melted at 285° C. therein, extruded through a T-shaped nozzle thereof in a sheet-like form and wound around a casting drum having a mirror-finished surface whose temperature is held at 25° C. by means of a static electricity applying casting method and allowed to be cooled and solidified to form a non-stretched film. The thus-formed non-stretched film was heated to 85° C., and stretched 3.3 times in a longitudinal direction to form a monoaxially oriented film. The thus-formed film was subjected to a corona discharge treatment in air and applied with a laminated layer forming coating liquid held at 25° C. While the thus-applied monoaxially oriented film was clipped with a clip, it was introduced into a preheating zone, dried at 90° C. therein, subsequently introduced into a heating zone thereof held at 100° C., continuously stretched in a width direction 3.3 times therein, and further subjected to a heating treatment in the heating zone held at 225° C. to obtain a laminated polyester film in which crystalline orientation has been completed. On this occasion, thickness of the base PET film and that of the laminated layer were 50 μm and 0.08 μm, respectively.

The laminated layer forming coating liquid used in this case was an aqueous dispersion liquid comprising that a1/b1=50/50. (in a weight ratio of solid contents), c1 was 1% by weight (based on a total weight of polyester resins a1 and b1) (in a weight ratio of solid contents) and c3 was 5% by weight (based on a total weight of polyester resins a1 and b1) (in a weight ratio of solid contents). Compositions of a1, b1, c1 and c3 are described below. Evaluation results are shown in Table 2.

EXAMPLE 11

Except that the laminated layer forming coating liquid of Example 10 was allowed to be in a relation that a1/b1=70/30 (in a weight ratio of solid contents), the laminated polyester film was obtained in a same manner as in Example 10. Results are shown in Table 2.

EXAMPLE 12

Except that the laminated layer forming coating liquid of Example 10 was allowed to be in a relation that a1/b2=50/50 (in a weight ratio of solid contents), the laminated polyester film was obtained in a same manner as in Example 10. Results are shown in Table 2.

EXAMPLE 13

PET pellets (limiting viscosity: 0.63 dl/g) containing 14% by weight of titanium dioxide having an average particle diameter of 0.2 μm and 0.5% by weight of silica having an average particle diameter of 1 μm were vacuum-dried, supplied to an extruder, melted at 285° C. therein, extruded through a T-shaped nozzle thereof in a sheet-like form, wound around a casting drum having a mirror-finished surface whose temperature was held at 25° C. by means of a static electricity applying casting method and allowed to be cooled and solidified to form a non-stretched film. The thus-formed non-stretched film was heated to 85° C., and stretched 3.3 times in a longitudinal direction to form a monoaxially oriented film. The thus-formed film was subjected to a corona discharge treatment in air and, then, the thus-treated surface thereof was applied with a same laminated layer forming coating liquid as in Example 1. While the thus-applied monoaxially oriented film was clipped with a clip, it was introduced into a preheating zone, dried at 95° C. therein, subsequently introduced into a heating zone thereof held at 110° C., continuously stretched in a width direction 3.3 times therein, and further subjected to a heating treatment in the heating zone held at 210° C. to obtain a laminated polyester film, in which a base film is white, provided with a laminated layer in which crystalline orientation has been completed. On this occasion, thickness, optical density, and whiteness of such PET film in which the base material is white were 50 μm, 1.5 and 85%, respectively, and, further, thickness of the laminated layer was 0.08 μm.

The laminated layer forming coating liquid used in this case was an aqueous dispersion liquid comprising that a1/b1=50/50 (in a weight ratio of solid contents), c1 was 1% by weight (in a weight ratio of solid contents) (based on a total weight of polyester resins a1 and b1) and c3 was 5% by weight (in a weight ratio of solid contents) (based on a total weight of polyester resins a1 and b1) Results are shown in Table 2.

EXAMPLE 14

Except that the laminated layer forming coating liquid of Example 10 was allowed to be that c2 was 2% by weight (in a weight ratio of solid contents) (based on a total weight of polyester resins a1 and b1), c3 was 5% by weight (in a weight ratio of solid contents) (based on a total weight of polyester resins a1 and b1), the laminated polyester film was obtained in a same manner as in Example 10. Results are shown in Table 2.

EXAMPLE 15

Except that the laminated layer forming coating liquid of Example 10 was allowed to be that c1 was 1.5% by weight (in a weight ratio of solid contents) (based on a total weight of polyester resins a1 and b1), c4 was 2% by weight (in a weight ratio of solid contents) (based on a total weight of polyester resins a1 and b1), the laminated polyester film was obtained in a same manner as in Example 10. Results are shown in Table 2.

EXAMPLE 16

Except that the laminated layer forming coating liquid of Example 10 was allowed to be that c1 was 4% by weight (in a weight ratio of solid contents) (based on a total weight of polyester resins a1 and b1), c4 was 8% by weight (in a weight ratio of solid contents) (based on a total weight of polyester resins a1 and b1) and the thickness of the laminated layer was 0.05 μm, the laminated polyester film was obtained in a same manner as in Example 10. Results are shown in Table 2.

EXAMPLE 17

Except that the laminated layer forming coating liquid of Example 10 was allowed to be that c1 was 1% by weight (in a weight ratio of solid contents) (based on a total weight of polyester resins a1 and b1), c4 was 2% by weight (in a weight ratio of solid contents) (based on a total weight of polyester resins a1 and b1) and the thickness of the laminated layer was 0.25 μm, the laminated polyester film was obtained in a same manner as in Example 10. Results are shown in Table 2.

EXAMPLE 18

Except that the laminated layer forming coating liquid of Example 11 was allowed to be that c1 was 1% by weight (in a weight ratio of solid contents) (based on a total weight of polyester resins a1 and b1), c3 was 5% by weight (in a weight ratio of solid contents) (based on a total weight of polyester resins a1 and b1) and the thickness of the laminated layer was 0.05 μm, the laminated polyester film was obtained in a same manner as in Example 11. Results are shown in Table 2.

EXAMPLE 19

Except that the laminated layer forming coating liquid of Example 11 was allowed to be that c2 was 2% by weight (in a weight ratio of solid contents) (based on a total weight of polyester resins a1 and b1), c3 was 5% by weight (in a weight ratio of solid contents) (based on a total weight of polyester resins a1 and b1), and the thickness of the laminated layer was 0.05 μm, the laminated polyester film was obtained in a same manner as in Example 11. Results are shown in Table 2.

COMPARATIVE EXAMPLE 6

Except that the laminated layer forming coating liquid of Example 10 was allowed to be in a relation that a1/b3=50/50 (in a weight ratio of solid contents), the laminated polyester film was obtained in a same manner as in Example 10. Results are shown in Table 2. The present Comparative Example which used the resin c3 that was outside the composition of the present invention was inferior in adhesiveness.

COMPARATIVE EXAMPLE 7

Except that the laminated layer forming coating liquid of Example 10 was allowed to be in a relation that a1/b4=50/50 (in a weight ratio of solid contents), the laminated polyester film was obtained in a same manner as in Example 10. Results are shown in Table 2. The present Comparative Example which used the resin b4 that was outside the composition of the present invention was inferior in adhesiveness.

COMPARATIVE EXAMPLE 8

Except that the laminated layer forming coating liquid of Example 10 was allowed to be in a relation that b1/b2=50/50 (in a weight ratio of solid contents), the laminated polyester film was obtained in a same manner as in Example 10. Results are shown in Table 2. The present Comparative Example that used only 2 types of the resins each of which has a low Tg was inferior in anti-blocking properties.

COMPARATIVE EXAMPLE 9

Except that the laminated layer forming coating liquid of Example 10 used only a1, the laminated polyester film was obtained in a same manner as in Example 10. Results are shown in Table 2. The present Comparative Example that used only the resin which has a high Tg was inferior in adhesiveness.

COMPARATIVE EXAMPLE 10

Except that the laminated layer forming coating liquid of Example 10 used only b1, the laminated polyester film was obtained in a same manner as in Example 10. Results are shown in Table 2. The present Comparative Example that used only the resin which has a low Tg was inferior in anti-blocking properties.

COMPARATIVE EXAMPLE 11

Except that the laminated layer forming coating liquid of Example 10 was allowed to be that c5 was 1% by weight (in a weight ratio of solid contents) (based on a total weight of polyester resins a1 and b1) and c3 was 5% by weight (in a weight ratio of solid contents) (based on a total weight of polyester resins a1 and b1), the laminated polyester film was obtained in a same manner as in Example 10. Results are shown in Table 2. The present Comparative Example in which particles (X) were unduly larger than thickness of the laminated layer was inferior in anti-blocking properties.

COMPARATIVE EXAMPLE 12

Except that the laminated layer forming coating liquid of Example 10 was allowed to be that c1 was 1.5% by weight (in a weight ratio of solid contents) (based on a total weight of polyester resins a1 and b1) and c6 was 5% by weight (in a weight ratio of solid contents) (based on a total weight of polyester resins a1 and b1), the laminated polyester film was obtained in a same manner as in Example 10. Results are shown in Table 2. The present Comparative Example in which particles (Y) were unduly smaller than thickness of the laminated layer was inferior in anti-blocking properties.

TABLE 2

| | Tg (° C.) | | Mixing ratio | r/d | | Quantity of particles (% by weight) | | Adhesiveness | | Anti-blocking properties |
|---|---|---|---|---|---|---|---|---|---|---|
| | (A) | (B) | A/B | $r_x/d$ | $r_y/d$ | Particles (X) | Particles (Y) | 3 | 4 | 2 |
| Example 10 | 80 | 18 | 50/50 | 12.5 | 1 | 1 | 5 | ⊚ | ○ | ⊚ |
| Example 11 | 80 | 18 | 70/30 | 12.5 | 1 | 1 | 5 | ⊚ | ○ | ⊚ |
| Example 12 | 80 | 38 | 50/50 | 12.5 | 1 | 1 | 5 | ⊚ | ○ | ⊚ |
| Example 13 | 80 | 18 | 50/50 | 12.5 | 1 | 1 | 5 | ⊚ | ○ | ⊚ |
| Example 14 | 80 | 18 | 50/50 | 3.8 | 1 | 2 | 5 | ⊚ | ○ | ⊚ |
| Example 15 | 80 | 18 | 50/50 | 12.5 | 0.6 | 1.5 | 2 | ⊚ | ○ | ⊚ |
| Example 16 | 80 | 18 | 50/50 | 20 | 1 | 4 | 8 | ⊚ | ○ | ○ |
| Example 17 | 80 | 18 | 50/50 | 4 | 0.2 | 1 | 2 | ⊚ | ○ | ○ |
| Example 18 | 80 | 18 | 70/30 | 20 | 1.6 | 1 | 5 | ⊚ | ○ | ⊚ |
| Example 19 | 80 | 18 | 70/30 | 6 | 1.6 | 2 | 5 | ⊚ | ○ | ⊚ |
| Comp. Ex. 6 | 80 | 35 | 50/50 | 12.5 | 1 | 1 | 5 | ○ | Δ | ○ |
| Comp. Ex. 7 | 80 | 45 | 50/50 | 12.5 | 1 | 1 | 5 | X | ○ | ⊚ |
| Comp. Ex. 8 | — | 38–18 | 50/50 | 12.5 | 1 | 1 | 5 | ⊚ | ○ | Δ |

TABLE 2-continued

| | Tg (° C.) | | Mixing ratio | r/d | | Quantity of particles (% by weight) | | Adhesiveness | | Anti-blocking properties |
|---|---|---|---|---|---|---|---|---|---|---|
| | (A) | (B) | A/B | $r_x/d$ | $r_y/d$ | Particles (X) | Particles (Y) | 3 | 4 | 2 |
| Comp. Ex. 9 | 80 | — | 100/0 | 12.5 | 1 | 1 | 5 | X | ◯ | ◯◯ |
| Comp. Ex. 10 | — | 18 | 0/100 | 12.5 | 1 | 1 | 5 | ◯◯ | ◯ | Δ |
| Comp. Ex. 11 | 80 | 18 | 50/50 | 63 | 1 | 1 | 5 | ◯◯ | ◯ | Δ |
| Comp. Ex. 12 | 80 | 18 | 50/50 | 12.5 | 0.06 | 1.5 | 5 | ◯◯ | ◯ | Δ |

EXAMPLE 20

PET pellets (limiting viscosity: 0.63 dl/g) containing 0.015% by weight of colloidal silica having an average particle diameter of 0.4 μm and 0.005% by weight of colloidal silica having an average particle diameter of 1.5 μm were vacuum-dried, supplied to an extruder, melted at 285° C. therein, extruded through a T-shaped nozzle thereof in a sheet-like form and wound around a casting drum having a mirror-finished surface whose temperature is held at 25° C. by means of a static electricity applying casting method and allowed to be cooled and solidified to form a non-stretched film. The thus-formed non-stretched film was heated to 85° C., and stretched 3.3 times in a longitudinal direction to form a monoaxially oriented film. The thus-formed film was subjected to a corona discharge treatment in air and applied with a laminated layer forming coating liquid held at 25° C. While the thus-applied monoaxially oriented film was clipped with a clip, it was introduced into a preheating zone, dried at 90° C. therein, subsequently introduced into a heating zone thereof held at 100° C., continuously stretched in a width direction 3.3 times therein, and further subjected to a heating treatment in the heating zone held at 225° C. to obtain a laminated polyester film in which crystalline orientation has been completed. On this occasion, thickness of the base PET film and that of the laminated layer were 50 μm and 0.08 μm, respectively.

The laminated layer forming coating liquid used in this case was an aqueous dispersion liquid comprising that a1/b1=50/50 (in a weight ratio of solid contents) and d1 was 2% by weight (based on a total weight of polyester resins a1 and b1). Compositions of a1, b1 and d1 are described below. Evaluation results are shown in Table 3. On this occasion, transparency was 1.2 in terms of a haze value; hence, the transparency was favorable.

EXAMPLE 21

Except that the laminated layer forming coating liquid of Example 20 was allowed to be an aqueous dispersion liquid comprising that a1/b1=70/30 (in a weight ratio of solid contents) and d1 was 1% by weight (based on a total weight of polyester resins a1 and b1), the laminated polyester film was obtained in a same manner as in Example 20. Results are shown in Table 3. On this occasion, transparency was 1.1 in terms of a haze value; hence, the transparency was favorable.

EXAMPLE 22

Except that the laminated layer forming coating liquid of Example 20 was allowed to be that a1/b2=50/50 (in a weight ratio of solid contents), the laminated polyester film was obtained in a same manner as in Example 20. Results are shown in Table 3. On this occasion, transparency was 1.3 in terms of a haze value; hence, the transparency was favorable.

EXAMPLE 23

PET pellets (limiting viscosity: 0.63 dl/g) containing 14% by weight of titanium dioxide having an average particle diameter of 0.2 μm and 0.5% by weight of silica having an average particle diameter of 1 μm were vacuum-dried, supplied to an extruder, melted at 285° C. therein, extruded through a T-shaped nozzle thereof in a sheet-like form, wound around a casting drum having a mirror-finished surface whose temperature was held at 25° C. by means of a static electricity applying casting method and allowed to be cooled and solidified to form a non-stretched film. The thus-formed non-stretched film was heated to 85° C., and stretched 3.3 times in a longitudinal direction to form a monoaxially oriented film. The thus-formed film was subjected to a corona discharge treatment in air and, then, the thus-treated surface thereof was applied with a same laminated layer forming coating liquid as in Example 1. While the thus-applied monoaxially oriented film was clipped with a clip, it was introduced into a preheating zone, dried at 95° C. therein, subsequently introduced into a heating zone thereof held at 110° C., continuously stretched in a width direction 3.3 times therein, and further subjected to a heating treatment in the heating zone held at 210° C. to obtain the laminated polyester film, in which a base film is white, provided with a laminated layer in which crystalline orientation has been completed. On this occasion, thickness, optical density, and whiteness of such polyester film in which the base material is white were 50 μm, 1.5 and 85%, respectively, and, further thickness of the laminated layer was 0.08 μm.

The laminated layer forming coating liquid used in this case was an aqueous dispersion liquid comprising that a1/b1=50/50 (in a weight ratio of solid contents) and d1 was 2% by weight (in a weight ratio of solid contents) (based on a total weight of the polyester resins a1 and b1). Results are shown in Table 3. This time, since the polyester film was white, transparency thereof was not evaluated.

EXAMPLE 24

Except that the laminated layer forming coating liquid of Example 20 was allowed to be that d2 was 2% by weight (in a weight ratio of solid contents) (based on a total weight of the polyester resins a1 and b1), the laminated polyester film was obtained in a same manner as in Example 20. Results are shown in Table 3. On this occasion, transparency was 1.3 in terms of a haze value; hence, the transparency was favorable.

EXAMPLE 25

Except that the laminated layer forming coating liquid of Example 20 was allowed to be that d1 was 6% by weight (based on a total weight of the polyester resins a1 and b1), the laminated polyester film was obtained in a same manner as in Example 20. Results are shown in Table 3. On this occasion, transparency was 1.1 in terms of a haze value; hence, the transparency was favorable.

EXAMPLE 26

Except that the laminated layer forming coating liquid of Example 20 was allowed to be that d1 was 0.5% by weight (in a weight ratio of solid contents) (based on a total weight of the polyester resins a1 and b1), the laminated polyester film was obtained in a same manner as in Example 20. Results are shown in Table 3. On this occasion, transparency was 1.5 in terms of a haze value; hence, the transparency was favorable.

EXAMPLE 27

Except that the laminated layer forming coating liquid of Example 20 was allowed to be that d1 was 8% by weight (in a weight ratio of solid contents) (based on a total weight of the polyester resins a1 and b1), the laminated polyester film was obtained in a same manner as in Example 20. Results are shown in Table 3. On this occasion, transparency was 1.1 in terms of a haze value; hence, the transparency was favorable.

EXAMPLE 28

Except that the laminated layer forming coating liquid of Example 20 was allowed to be that d1 was 2% by weight (in a weight ratio of solid contents) (based on a total weight of the polyester resins a1 and b1) and c1 was 1% by weight (in a weight ratio of solid contents) (based on a total weight of the polyester resins a1 and b1), the laminated polyester film was obtained in a same manner as in Example 20. Results are shown in Table 3. On this occasion, transparency was 1.4 in terms of a haze value; hence, the transparency was favorable.

EXAMPLE 29

Except that the laminated layer forming coating liquid of Example 20 was allowed to be that d1 was 2% by weight (in a weight ratio of solid contents) (based on a total weight of the polyester resins a1 and b1) and c2 was 2% by weight (in a weight ratio of solid contents) (based on a total weight of the polyester resins a1 and b1), the laminated polyester film was obtained in a same manner as in Example 20. Results are shown in Table 3. On this occasion, transparency was 1.3 in terms of a haze value; hence, the transparency was favorable.

EXAMPLE 30

Except that the laminated layer forming coating liquid of Example 20 was allowed to be that d1 was 2% by weight (in a weight ratio of solid contents) (based on a total weight of the polyester resins a1 and b1) and c7 was 3% by weight (in a weight ratio of solid contents) (based on a total weight of the polyester resins a1 and b1), the laminated polyester film was obtained in a same manner as in Example 20. Results are shown in Table 3. On this occasion, transparency was 1.3 in terms of a haze value; hence, the transparency was favorable.

EXAMPLE 31

Except that the laminated layer forming coating liquid of Example 20 was allowed to be that d1 was 2% by weight (in a weight ratio of solid contents) (based on a total weight of the polyester resins a1 and b1) and c3 was 5% by weight (in a weight ratio of solid contents) (based on a total weight of the polyester resins a1 and b1), the laminated polyester film was obtained in a same manner as in Example 20. Results are shown in Table 3. On this occasion, transparency was 1.5 in terms of a haze value; hence, the transparency was favorable.

COMPARATIVE EXAMPLE 13

Except that the laminated layer forming coating liquid of Example 20 was allowed to be in a relation that a1/b3=50/50 (in a weight ratio of solid contents), the laminated polyester film was obtained in a same manner as in Example 20. Results are shown in Table 3. The present Comparative Example which used the resin b3 that was outside the composition of the present invention was favorable in transparency in which a haze value was 1.4 but was inferior in adhesiveness.

COMPARATIVE EXAMPLE 14

Except that the laminated layer forming coating liquid of Example 20 was allowed to be in a relation that a1/b4=50/50 (in a weight ratio of solid contents), the laminated polyester film was obtained in a same manner as in Example 20. Results are shown in Table 3. The present Comparative Example which used the resin b4 that was outside the composition of the present invention was favorable in transparency in which a haze value was 1.2 but was inferior in adhesiveness.

COMPARATIVE EXAMPLE 15

Except that the laminated layer forming coating liquid of Example 20 was allowed to be in a relation that b1/b2=50/50 (in a weight ratio of solid contents), the laminated polyester film was obtained in a same manner as in Example 20. Results are shown in Table 3. The present Comparative Example that used only 2 types of the resins each of which has a low Tg was slightly inferior in transparency in which a haze value was 1.6 but was inferior in anti-blocking properties.

COMPARATIVE EXAMPLE 16

Except that the laminated layer forming coating liquid of Example 20 used only a1, the laminated polyester film was obtained in a same manner as in Example 20. Results are shown in Table 3. The present Comparative Example that used only the resin which has a high Tg was favorable in transparency in which a haze value was 1.3 but was inferior in adhesiveness.

COMPARATIVE EXAMPLE 17

Except that the laminated layer forming coating liquid of Example 20 used only b1, the laminated polyester film was obtained in a same manner as in Example 20. Results are shown in Table 3. The present Comparative Example that used only the resin which has a low Tg was slightly inferior in transparency in which a haze value was 1.6 but was inferior in anti-blocking properties.

TABLE 3

| | Tg (° C.) | | Mixing ratio | Acrylic resin | | Particles | | Adhesiveness | | Anti-blocking properties | Haze |
|---|---|---|---|---|---|---|---|---|---|---|---|
| | (A) | (B) | A/B | Type | (% by weight) | r/d | (% by weight) | 5 | 6 | 3 | % |
| Example 20 | 80 | 18 | 50/50 | d1 | 2 | — | — | ◯◯ | ◯ | ◯◯ | 1.2 |
| Example 21 | 80 | 18 | 70/30 | d1 | 1 | — | — | ◯◯ | ◯ | ◯◯ | 1.1 |
| Example 22 | 80 | 38 | 50/50 | d1 | 2 | — | — | ◯◯ | ◯ | ◯◯ | 1.3 |
| Example 23 | 80 | 18 | 50/50 | d1 | 2 | — | — | ◯◯ | ◯ | ◯◯ | — |
| Example 24 | 80 | 18 | 50/50 | d2 | 2 | — | — | ◯◯ | ◯ | ◯ | 1.3 |
| Example 25 | 80 | 18 | 50/50 | d1 | 6 | — | — | ◯ | ◯ | ◯ | 1.1 |
| Example 26 | 80 | 18 | 50/50 | d1 | 0.5 | — | — | ◯◯ | ◯ | ◯ | 1.5 |
| Example 27 | 80 | 18 | 50/50 | d1 | 8 | — | — | ◯ | ◯ | ◯◯ | 1.1 |
| Example 28 | 80 | 18 | 50/50 | d1 | 2 | 12.5 | 1 | ◯◯ | ◯ | ◯◯ | 1.4 |
| Example 29 | 80 | 18 | 50/50 | d1 | 2 | 3.8 | 2 | ◯◯ | ◯ | ◯◯ | 1.3 |
| Example 30 | 80 | 18 | 50/50 | d1 | 2 | 1.8 | 3 | ◯◯ | ◯ | ◯◯ | 1.3 |
| Example 31 | 80 | 18 | 50/50 | d1 | 2 | 1 | 5 | ◯◯ | ◯ | ◯◯ | 1.5 |
| Comp. Ex. 13 | 80 | 35 | 50/50 | d1 | 2 | — | — | ◯ | Δ | ◯ | 1.4 |
| Comp. Ex. 14 | 80 | 45 | 50/50 | d1 | 2 | — | — | X | ◯ | ◯◯ | 1.2 |
| Comp. Ex. 15 | — | 38–18 | 50/50 | d1 | 2 | — | — | ◯◯ | ◯ | X | 1.6 |
| Comp. Ex. 16 | 80 | — | 100/0 | d1 | 2 | — | — | X | ◯ | ◯◯ | 1.3 |
| Comp. Ex. 17 | — | 18 | 0/100 | d1 | 2 | — | — | ◯◯ | ◯ | X | 1.6 |

EXAMPLE 32

PET pellets (limiting viscosity: 0.63 dl/g) containing 0.015% by weight of colloidal silica having an average patticle diameter of 0.4 μm and 0.005% by weight of colloidal silica having an average particle diameter of 1.5 μm were vacuum-dried, supplied to an extruder, melted at 285° C. therein, extruded through a T-shaped nozzle thereof in a sheet-like form and wound around a casting drum having a mirror-finished surface whose temperature is held at 25° C. by means of a static electricity applying casting method and allowed to be cooled and solidified to form a non-stretched film The thus-formed non-stretched film was heated to 85° C., and stretched 3.3 times in a longitudinal direction to form a monoaxially oriented film. The thus-formed film was subjected to a corona discharge treatment in air and applied with a laminated layer forming coating liquid held at 25° C. While the thus-applied monoaxially oriented film was clipped with a clip, it was introduced into a preheating zone, dried at 90° C. therein, subsequently introduced into a heating zone thereof held at 100° C., continuously stretched in a width direction 3.3 times therein, and further subjected to a heating treatment in the heating zone held at 225° C. to obtain a laminated polyester film in which crystalline orientation has been completed. On this occasion, thickness of the base PET film and that of the laminated layer were 50 μm and 0.08 μm, respectively.

The laminated layer forming coating liquid used in this case was an aqueous dispersion liquid comprising that a1/b1=50/50 (in a weight ratio of solid contents) and e1 was 2% by weight (based on a total weight of polyester resins a1 and b1)(in a weight ratio of solid contents). Compositions of a1, b1 and e1 are described below. Evaluation results are shown in Table 4. On this occasion, the laminated layer was not scraped; hence, scratch resistance was favorable.

EXAMPLE 33

Except that the laminated layer forming coating liquid of Example 32 was an aqueous dispersion liquid comprising that a1/b1=70/30 (in a weight ratio of solid contents) and e1 was 1% by weight (based on a total weight of polyester resins a1 and b1)(in a weight ratio of solid contents), the laminated polyester film was obtained in a same manner as in Example 32. Results are shown in Table 4. On this occasion, the laminated layer was not scraped; hence, scratch resistance was favorable.

EXAMPLE 34

Except that the laminated layer forming coating liquid of Example 32 was allowed to be in a relation that a1/b2=50/50 (in a weight ratio of solid contents), the laminated polyester film was obtained in a same manner as in Example 32. Results are shown in Table 4. On this occasion, the laminated layer was not scraped; hence, scratch resistance was favorable.

EXAMPLE 35

PET pellets (limiting viscosity: 0.63 dl/g) containing 14% by weight of titanium dioxide having an average particle diameter of 0.2 μm and 0.5% by weight of silica having an average particle diameter of 1 μm were vacuum-dried, supplied to an extruder, melted at 285° C. therein, extruded through a T-shaped nozzle thereof in a sheet-like form, wound around a casting drum having a mirror-finished surface whose temperature was held at 25° C. by means of a static electricity applying casting method and allowed to be cooled and solidified to form a non-stretched film. The thus-formed non-stretched film was heated to 85° C., and stretched 3.3 times in a longitudinal direction to form a monoaxially oriented film. The thus-formed film was subjected to a corona discharge treatment in air and, then, the thus-treated surface thereof was applied with a same laminated layer forming coating liquid as in Example 1. While the thus-applied monoaxially oriented film was clipped with a clip, it was introduced into a preheating zone, dried at 95° C. therein, subsequently introduced into a heating zone thereof held at 110° C., continuously stretched in a width direction 3.3 times therein, and further subjected to a heating treatment in the heating zone held at 210° C. to obtain a laminated polyester film, in which a base film is white, provided with a laminated layer in which crystalline orientation has been completed. On this occasion, thickness, optical density, and whiteness of such PET film in which the base material is white were 50 μm, 1.5 and 85%, respectively, and, further, thickness of the laminated layer was 0.08 μm.

The laminated layer forming coating liquid used in this case was an aqueous dispersion liquid comprising that a1/b1=5.0/50 (in a weight ratio of solid contents) and e1 was 2% by weight (based on a total weight of polyester resins a1 and b1). Results are shown in Table 4. On this occasion, the laminated layer was not scraped; hence, scratch resistance was favorable.

EXAMPLE 36

Except that the laminated layer forming coating liquid of Example 32 was allowed to be that e2 was 2% by weight (in a weight ratio of solid contents) (based on a total weight of polyester resins a1 and b1), the laminated polyester film was obtained in a same manner as in Example 32. Results are shown in Table 4. On this occasion, the laminated layer was not scraped; hence, scratch resistance was favorable.

EXAMPLE 37

Except that the laminated layer forming coating liquid of Example 32 was allowed to be that e1 was 6% by weight (in a weight ratio of solid contents) (based on a total weight of polyester resins a1 and b1), the laminated polyester film was obtained in a same manner as in Example 32. Results are shown in Table 4. On this occasion, the laminated layer was not scraped; hence, scratch resistance was favorable.

EXAMPLE 38

Except that the laminated layer forming coating liquid of Example 32 was allowed to be that e1 was 0.5% by weight (in a weight ratio of solid contents) (based on a total weight of polyester resins a1 and b1), the laminated polyester film was obtained in a same manner as in Example 32. Results are shown in Table 4.

EXAMPLE 39

Except that the laminated layer forming coating liquid of Example 32 was allowed to be that e1 was 8% by weight (based on a total weight of polyester resins a1 and b1), the laminated polyester film was obtained in a same manner as in Example 32. Results are shown in Table 4.

EXAMPLE 40

Except that the laminated layer forming coating liquid of Example 32 was allowed to be that e1 was 2% by weight (in a weight ratio of solid contents) (based on a total weight of polyester resins a1 and b1) and c1 was 1% by weight (in a weight ratio of solid contents) (based on a total weight of polyester resins a1 and b1), the laminated polyester film was obtained in a same manner as in Example 32. Results are shown in Table 4. On this occasion, the laminated layer was not scraped; hence, scratch resistance was favorable.

EXAMPLE 41

Except that the laminated layer forming coating liquid of Example 32 was allowed to be that e1 was 2% by weight (in a weight ratio of solid contents) (based on a total weight of polyester resins a1 and b1) and c2 was 2% by weight (in a weight ratio of solid contents) (based on a total weight of polyester resins a1 and b1), the laminated polyester film was obtained in a same manner as in Example 32. Results are shown in Table 4. On this occasion, the laminated layer was not scraped; hence, scratch resistance was favorable.

EXAMPLE 42

Except that the laminated layer forming coating liquid of Example 32 was allowed to be that e1 was 2% by weight (in a weight ratio of solid contents) (based on a total weight of polyester resins a1 and b1) and c7 was 3% by weight (in a weight ratio of solid contents) (based on a total weight of polyester resins a1 and b1), the laminated polyester film was obtained in a same manner as in Example 32. Results are shown in Table 4. On this occasion, the laminated layer was not scraped; hence, scratch resistance was favorable.

EXAMPLE 43

Except that the laminated layer forming coating liquid of Example 32 was allowed to be that e1 was 2% by weight (in a weight ratio of solid contents) (based on a total weight of polyester resins a1 and b1) and c3 was 5% by weight (in a weight ratio of solid contents) (based on a total weight of polyester resins a1 and b1), the laminated polyester film was obtained in a same manner as in Example 32. Results are shown in Table 4. On this occasion, the laminated layer was not scraped; hence, scratch resistance was favorable.

COMPARATIVE EXAMPLE 18

Except that the laminated layer forming coating liquid of Example 32 was allowed to be in a relation that a1/b3=50/50 (in a weight ratio of solid contents), the laminated polyester film was obtained in a same manner as in Example 32. Results are shown in Table 4. The present Comparative Example which used the resin c3 that was outside the composition of the present invention was inferior in adhesiveness and, in regard to scratch resistance thereof, the laminated layer was slightly scraped.

COMPARATIVE EXAMPLE 19

Except that the laminated layer forming coating liquid of Example 32 was allowed to be in a relation that b1/b4=50/50 (in a weight ratio of solid contents), the laminated polyester film was obtained in a same manner as in Example 32. Results are shown in Table 4. The present Comparative Example that used only the resin b4 which was outside the composition according to the present invention was inferior in adhesiveness. In regard to scratch resistance, the laminated layer was slightly scraped.

COMPARATIVE EXAMPLE 20

Except that the laminated layer forming coating liquid of Example 32 was allowed to be in a relation that b1/b2=50/50 (in a weight ratio of solid contents), the laminated polyester film was obtained in a same manner as in Example 32. Results are shown in Table 4. The present Comparative Example that used only two types of the resins each of which has a low Tg was favorable in scratch resistance, since the laminated layer was not scraped, but was inferior in anti-blocking properties.

COMPARATIVE EXAMPLE 21

Except that the laminated layer forming coating liquid of Example 32 used only a1, the laminated polyester film was obtained in a same manner as in Example 32. Results are shown in Table 4. The present Comparative Example that used only the resin which has a high Tg was favorable in scratch resistance, since the laminated layer was not scraped, but was inferior in adhesiveness.

COMPARATIVE EXAMPLE 22

Except that the laminated layer forming coating liquid of Example 32 used only b1, the laminated polyester film was obtained in a same manner as in Example 32. Results are shown in Table 4. The present Comparative Example that used only the resin which has a low Tg was favorable in scratch resistance, since the laminated layer was not scraped, but was inferior in anti-blocking properties.

TABLE 4

| | Tg (° C.) (A) | Tg (° C.) (B) | Mixing ratio A/B | Wax Type | Wax (% by weight) | Particles r/d | Particles (% by weight) | Adhesiveness 7 | Adhesiveness 8 | Anti-blocking properties 4 |
|---|---|---|---|---|---|---|---|---|---|---|
| Example 32 | 80 | 18 | 50/50 | e1 | 2 | — | — | ◯◯ | ◯ | ◯◯ |
| Example 33 | 80 | 18 | 70/30 | e1 | 1 | — | — | ◯◯ | ◯ | ◯◯ |
| Example 34 | 80 | 38 | 50/50 | e1 | 2 | — | — | ◯◯ | ◯ | ◯◯ |
| Example 35 | 80 | 18 | 50/50 | e1 | 2 | — | — | ◯◯ | ◯ | ◯◯ |
| Example 36 | 80 | 18 | 50/50 | e2 | 2 | — | — | ◯◯ | ◯ | ◯◯ |
| Example 37 | 80 | 18 | 50/50 | e1 | 6 | — | — | ◯ | ◯ | ◯◯ |
| Example 38 | 80 | 18 | 50/50 | e1 | 0.5 | — | — | ◯◯ | ◯ | ◯ |
| Example 39 | 80 | 18 | 50/50 | e1 | 8 | — | — | ◯ | ◯ | ◯◯ |
| Example 40 | 80 | 18 | 50/50 | e1 | 2 | 12.5 | 1 | ◯◯ | ◯ | ◯◯ |
| Example 41 | 80 | 18 | 50/50 | e1 | 2 | 3.8 | 2 | ◯◯ | ◯ | ◯◯ |
| Example 42 | 80 | 18 | 50/50 | e1 | 2 | 1.8 | 3 | ◯◯ | ◯ | ◯◯ |
| Example 43 | 80 | 18 | 50/50 | e1 | 2 | 1 | 5 | ◯◯ | ◯ | ◯◯ |
| Comp. Ex. 18 | 80 | 35 | 50/50 | e1 | 2 | — | — | ◯ | △ | ◯ |
| Comp. Ex. 19 | 80 | 45 | 50/50 | e1 | 2 | — | — | X | ◯ | ◯◯ |
| Comp. Ex. 20 | — | 38–18 | 50/50 | e1 | 2 | — | — | ◯◯ | ◯ | X |
| Comp. Ex. 21 | 80 | — | 100/0 | e1 | 2 | — | — | X | X | ◯◯ |
| Comp. Ex. 22 | — | 18 | 0/100 | e1 | 2 | — | — | ◯◯ | ◯ | X |

EXAMPLE 44

PET pellets (limiting viscosity: 0.63 dl/g) containing 0.015% by weight of colloidal silica having an average particle diameter of 0.4 μm and 0.005% by weight of colloidal silica having an average particle diameter of 1.5 μm were sufficiently vacuum-dried, supplied to an extruder, melted at 285° C. therein, extruded through a T-shaped nozzle thereof in a sheet-like form and wound around a casting drum having a mirror-finished surface whose temperature is held at 25° C. by means of a static electricity applying casting method and allowed to be cooled and solidified. The resultant non-stretched film was heated to 85° C., and stretched 3.3 times in a longitudinal direction to form a monoaxially oriented film. The thus-formed film was subjected to a corona discharge treatment in air and applied with a laminated layer forming coating liquid held at 25° C. While the thus-applied monoaxially oriented film was clipped with a clip, it was introduced into a preheating zone, dried at 90° C. therein, subsequently introduced into a heating zone thereof held at 100° C., continuously stretched in a width direction 3.3 times therein, and further subjected to a heating treatment in the heating zone held at 225° C. to obtain a laminated polyester film in which crystalline orientation has been completed. On this occasion, thickness of the base PET film and that of the laminated layer were 50 μm and 0.08 μm, respectively.

The laminated layer forming coating liquid used in this case was in a relation that a1/b1=40/60 (in a weight ratio of solid contents). Evaluation results are shown in Table 5.

EXAMPLE 45

Except that the laminated layer forming coating liquid of Example 44 was allowed to be in a relation that b1/b2=40/60 (in a weight ratio of solid contents), the laminated polyester film was obtained in a same manner as in Example 44. Results are shown in Table 5.

EXAMPLE 46

Except that the laminated layer forming coating liquid of Example 44 was allowed to be in a relation that b1/b2=70/30 (in a weight ratio of solid contents), the laminated polyester film was obtained in a same manner as in Example 44. Results are shown in Table 5.

EXAMPLE 47

PET pellets (limiting viscosity: 0.63 dl/g) containing 14% by weight of titanium dioxide having an average particle diameter of 0.2 μm and 0.5% by weight of silica having an average particle diameter of 1 μm were sufficiently vacuum-dried, supplied to an extruder, melted at 285° C. therein, extruded through a T-shaped nozzle thereof in a sheet-like form, wound around a casting drum having a mirror-finished surface whose temperature was held at 25° C. by means of a static electricity applying casting method and allowed to be cooled and solidified. The resultant non-stretched film was heated to 85° C., and stretched 3.3 times in a longitudinal direction to form a monoaxially oriented film. The thus-formed film was subjected to a corona discharge treatment in air and, then, the thus-treated surface thereof was applied with a same laminated layer forming coating liquid as in Example 1. While the thus-applied monoaxially oriented film was clipped with a clip, it was introduced into a preheating zone, dried at 95° C. therein, subsequently introduced into a heating zone thereof held at 110° C., continuously stretched in a width direction 3.3 times therein, and further subjected to a heating treatment in the heating zone held at 210° C. to obtain a white laminated polyester film provided with a laminated layer in which crystalline orientation has been completed. On this occasion, thickness, optical density, and whiteness of such PET film in which the base material is white were 50 μm, 1.5 and 85%, respectively, and, further, thickness of the laminated layer was 0.08 μm. The laminated layer forming coating liquid used in this case was in a relation that a1/b1=40/60 (in a weight ratio of solid contents). Results are shown in Table 5.

COMPARATIVE EXAMPLE 23

Except that the laminated layer forming coating liquid of Example 44 was allowed to be in a relation that a1/b3=40/60 (in a weight ratio of solid contents), the laminated polyester film was obtained in a same manner as in Example 44. Results are shown in Table 5.

COMPARATIVE EXAMPLE 24

Except that the laminated layer forming coating liquid of Example 44 was allowed to be in a relation that a1/b4=40/60 (in a weight ratio of solid contents), the laminated polyester film was obtained in a same-manner as in Example 44. Results are shown in Table 5.

COMPARATIVE EXAMPLE 25

Except that the laminated layer forming coating liquid of Example 44 was allowed to be in a relation that b1/b2=40/60 (in a weight ratio of solid contents), the laminated polyester film was obtained in a same manner as in Example 44. Results are shown in Table 5.

COMPARATIVE EXAMPLE 26

Except that the laminated layer forming coating liquid of Example 44 used only a1, the laminated polyester film was obtained in a same manner as in Example 44. Results are shown in Table 5.

COMPARATIVE EXAMPLE 27

Except that the laminated layer forming coating liquid of Example 44 used only b1, the laminated polyester film was obtained in a same manner as in Example 44. Results are shown in Table 5.

EXAMPLE 48

Except that the laminated layer forming coating liquid of Example 44 was added with 0.3% by weight of colloidal silica (particle diameter: 0.3 μm) (based on a total weight of polyester resins a1 and b1), the laminated polyester film was obtained in a same manner as in Example 44. Thickness of the laminated layer was 0.08 μm. Results are shown in Table 5.

EXAMPLE 49

Except that the laminated layer forming coating liquid of Example 44 was added with 3% by weight of colloidal silica (particle diameter: 0.08 μm) (based on a total weight of polyester resins a1 and b1), the laminated polyester film was obtained in a same manner as in Example 44. Thickness of the laminated layer was 0.08 μm. Results are shown in Table 5.

TABLE 5

| | Tg (° C.) | | Mixing ratio | Particles (% by weight) | | Adhesive-ness | | Anti-blocking properties |
|---|---|---|---|---|---|---|---|---|
| | (A) | (B) | A/B | r/d | weight | 9 | 10 | 5 |
| Example 44 | 80 | 18 | 40/60 | — | — | ○ | ○ | ○ |
| Example 45 | 80 | 38 | 40/60 | — | — | ○ | ○ | ○ |
| Example 46 | 80 | 38 | 70/30 | — | — | ○ | ○ | ○ |
| Example 47 | 80 | 18 | 40/60 | — | — | ○ | ○ | ○ |
| Comp. Ex. 23 | 80 | 35 | 40/60 | — | — | Δ | Δ | Δ |
| Comp. Ex. 24 | 80 | 45 | 40/60 | — | — | ○ | X | ○ |
| Comp. Ex. 25 | — | 38–18 | 0/(40/60) | — | — | ○ | ○ | X |
| Comp. Ex. 26 | 80 | — | 100/0 | — | — | ○ | Δ | ○ |
| Comp. Ex. 27 | — | 18 | 0/100 | — | — | ○ | ○ | X |
| Example 48 | 80 | 18 | 40/60 | 3.8 | 0.3 | ○ | ○ | ○○ |

TABLE 5-continued

| | Tg (° C.) | | Mixing ratio | Particles (% by weight) | | Adhesive-ness | | Anti-blocking properties |
|---|---|---|---|---|---|---|---|---|
| | (A) | (B) | A/B | r/d | weight | 9 | 10 | 5 |
| Example 49 | 80 | 18 | 40/60 | 1 | 3 | ○ | ○ | ○○ |

EXAMPLE 50

PET pellets (limiting viscosity: 0.63 dl/g) containing 0.015% by weight of colloidal silica having an average particle diameter of 0.4 μm and 0.005% by weight of colloidal silica having an average particle diameter of 1.5 μm were sufficiently vacuum-dried, supplied to an extruder, melted at 285° C. therein, extruded through a T-shaped nozzle thereof in a sheet-like form and wound around a casting drum having a mirror-finished surface whose temperature is held at 25° C. by means of a static electricity applying casting method and allowed to be cooled and solidified. The resultant non-stretched film was heated to 85° C., and stretched 3.3 times in a longitudinal direction to form a monoaxially oriented film. The thus-formed film was subjected to a corona discharge treatment in air and applied with a laminated layer forming coating liquid held at 25° C. While the thus-applied monoaxially oriented film was clipped with a clip, it was introduced into a preheating zone, dried at 90° C. therein, subsequently introduced into a heating zone thereof held at 100° C., continuously stretched in a width direction 3.3 times therein, and further subjected to a heating treatment in the heating zone held at 225° C. to obtain a laminated polyester film in which crystalline orientation has been completed. On this occasion, thickness of the base PET film and that of the laminated layer were 50 μm and 0.08 μm, respectively.

The laminated layer forming coating liquid used in this case was an aqueous dispersion liquid comprising that a1/b1=60/40 (in a weight ratio of solid contents). Evaluation results are shown in Table 6.

EXAMPLE 51

Except that the laminated layer forming coating liquid of Example 50 was allowed to be in a relation that a1/b2=60/40 (in a weight ratio of solid contents), the laminated polyester film was obtained in a same manner as in Example 50. Results are shown in Table 6.

EXAMPLE 52

PET pellets (limiting viscosity: 0.63 dl/g) containing 14% by weight of titanium dioxide having an average particle diameter of 0.2 μm and 0.5% by weight of silica having an average particle diameter of 1 μm were sufficiently vacuum-dried, supplied to an extruder, melted at 285° C. therein, extruded through a T-shaped nozzle thereof in a sheet-like form, wound around a casting drum having a mirror-finished surface whose temperature was held at 25° C. by means of a static electricity applying casting method and allowed to be cooled and solidified. The resultant non-stretched film was heated to 85° C., and stretched 3.3 times in a longitudinal direction to form a monoaxially oriented film. The thus-formed film was subjected to a corona discharge treatment in air and, then, the thus-treated surface thereof was applied with a same laminated layer forming coating liquid as in Example 1. While the thus-applied monoaxially oriented film was clipped with a clip, it was introduced into a preheating zone, dried at 95° C. therein, subsequently introduced into a heating zone thereof held at 110° C., continuously stretched in a width direction 3.3 times therein, and further subjected to a heating treatment in the heating zone held at 210° C. to obtain a white laminated polyester film provided with a laminated layer in which crystalline orientation has been completed. On this occasion, thickness, optical density, and whiteness of such PET film in which the base material is white were 50 μm, 1.5 and 85%, respectively, and, further, thickness of the laminated layer was 0.08 μm. The laminated layer forming coating liquid used in this case was an aqueous dispersion liquid comprising that a1/b1=60/40 (in a weight ratio of solid contents). Results are shown in Table 6.

COMPARATIVE EXAMPLE 28

Except that the laminated layer forming coating liquid of Example 50 was allowed to be in a relation that a1/b3=60/40 (in a weight ratio of solid contents), the laminated polyester film was obtained in a same manner as in Example 50. Results are shown in Table 6.

COMPARATIVE EXAMPLE 29

Except that the laminated layer forming coating liquid of Example 50 was allowed to be in a relation that a1/b4=60/40 (in a weight ratio of solid contents), the laminated polyester film was obtained in a same manner as in Example 50. Results are shown in Table 6.

COMPARATIVE EXAMPLE 30

Except that the laminated layer forming coating liquid of Example 50 was allowed to be in a relation that b1/b2=60/40 (in a weight ratio of solid contents), the laminated polyester film was obtained in a same manner as in Example 50. Results are shown in Table 6.

COMPARATIVE EXAMPLE 31

Except that the laminated-layer forming coating liquid of Example 50 used only a1, the laminated polyester film was obtained in a same manner as in Example 50. Results are shown in Table 6.

COMPARATIVE EXAMPLE 32

Except that the laminated layer forming coating liquid of Example 50 used only b1, the laminated polyester film was obtained in a same manner as in Example 50. Results are shown in Table 6.

EXAMPLE 53

Except that the laminated layer forming coating liquid of Example 50 was added with 0.3% by weight (in a weight ratio of solid contents) of colloidal silica c2 (based on a total weight of polyester resins a1 and b1), the laminated polyester film was obtained in a same manner as in Example 50. Thickness of the laminated layer was 0.08 μm. Results are shown in Table 6.

EXAMPLE 54

Except that the laminated layer forming coating liquid of Example 50 was added with 3% by weight (in a weight ratio of solid contents) of colloidal silica c3 (based on a total weight of polyester resins a1 and b1), the laminated polyester film was obtained in a same manner as in Example 50. Thickness of the laminated layer was 0.08 μm. Results are shown in Table 6.

TABLE 6

| | Tg (° C.) | | Mixing ratio | Particles | | Adhesiveness | | Anti-blocking properties |
| --- | --- | --- | --- | --- | --- | --- | --- | --- |
| | (A) | (B) | A/B | r/d | (% by weight) | 11 | 12 | 6 |
| Example 50 | 80 | 18 | 60/40 | — | — | ⊚ | ○ | ○ |
| Example 51 | 80 | 38 | 60/40 | — | — | ⊚ | ○ | ○ |
| Example 52 | 80 | 18 | 60/40 | — | — | ⊚ | ○ | ○ |
| Comp. Ex. 28 | 80 | 35 | 60/40 | — | — | ○ | ○ | Δ |
| Comp. Ex. 29 | 80 | 45 | 60/40 | — | — | X | ○ | ○ |
| Comp. Ex. 30 | — | 38–18 | 0/(60/40) | — | — | ⊚ | ○ | X |
| Comp. Ex. 31 | 80 | — | 100/0 | — | — | X | ○ | ○ |
| Comp. Ex. 32 | — | 18 | 0/100 | — | — | ⊚ | ○ | X |
| Example 53 | 80 | 18 | 60/40 | 3.8 | 0.3 | ⊚ | ○ | ⊚ |
| Example 54 | 80 | 18 | 60/40 | 1 | 3 | ⊚ | ○ | ⊚ |

EXAMPLE 55

The laminated polyester film obtained in Example 1 was crushed, supplied to an extruder, melted at about 280° C. therein and palletized. The resultant pellets and PET were mixed thereamong at a mixing ratio of 20/80 in a weight ratio, melted and subjected to film-forming in a same manner as in Example 1 to form a reclaimed laminated polyester film having a thickness of 50 μm.

The laminated layer forming coating liquid used in this case was an aqueous dispersion liquid comprising that a1/b1=80/20 (in a weight ratio of solid contents) and thickness of the laminated layer was 0.08 μm. Results are shown in Table 7.

EXAMPLE 56

Except that the pellets obtained in Example 55 and PET were mixed thereamong at a mixing ratio of 40/60 in a weight ratio, a reclaimed laminated polyester film was obtained in a same manner as in Example 55. Results are shown in Table 7.

EXAMPLE 57

Except that the pellets obtained in Example 55 and PET were mixed thereamong at a mixing ratio of 50/50 in a weight ratio, a reclaimed laminated polyester film was obtained in a same manner as in Example 55. Results are shown in Table 7.

TABLE 7

| | Polyester (A) Type | Polyester (A) Type | Mixing ratio A/B | Reclaimed material quantity (% by weight) | Adhesiveness 13 | Number of foreign matters | Discoloration degree |
|---|---|---|---|---|---|---|---|
| Example 55 | a1 | b1 | 80/20 | 20 | ○ | ○ | ○ |
| Example 56 | a1 | b1 | 80/20 | 40 | ○ | ○ | ○ |
| Example 57 | a1 | b1 | 80/20 | 50 | ○ | Δ | Δ |

Resins, particles and the like which have been used for forming laminated layers and the like in the above-described Examples and Comparative Examples are as follows:

a1: an aqueous dispersion of a polyester resin (Tg: 80° C.) comprising terephthalic acid (88% by mol), 5-sodium sulfoisophthalate (12% by mol), ethylene glycol (95% by mol) and diethylene glycol (5% by mol).

a2: an aqueous dispersion of a polyester resin (Tg: 78° C.) comprising terephthalic acid (85% by mol), 5-sodium sulfoisophthalate (15% by mol), ethylene glycol (97% by mol) and diethylene glycol (3% by mol).

b1: an aqueous dispersion of a polyester resin (Tg: 18° C.) comprising isophthalic acid (93% by mol), 5-sodium sulfoisophthalate (7% by mol), ethylene glycol (10% by mol) and diethylene glycol (90% by mol).

b2: an aqueous dispersion of a polyester resin (Tg: 38° C.) comprising isophthalic acid (91% by mol), 5-sodium sulfoisophthalate (9% by mol), ethylene glycol (5% by mol), diethylene glycol (80% by mol) and cyclohexane dimethanol (15% by mol).

b3: an aqueous dispersion of a polyester resin (Tg: 35° C.) comprising terephtahlic acid (25% by mol), isophthalic acid (65% by mol), trimellitic acid (10% by mol), ethylene glycol (50% by mol) and neopentyl glycol (50% by mol).

b4: an aqueous dispersion of a polyester resin (Tg: 45° C.) comprising terephthalic acid (85% by mol), 5-sodium sulfoisophthalate (15% by mol), ethylene glycol (75% by mol) diethylene glycol (20% by mol) and polyethylene glycol (molecular weight: 1000) (5% mol).

b5: an aqueous dispersion of a polyester resin (Tg: 40° C.) comprising terephthalic acid (30% by mol), isophthalic acid (60% by mol), 5-sodium sulfoisophthalate (10% by mol) ethylene glycol (5% by mol), diethylene glycol (80% by mol) and cyclohexane dimethanol (15% by mol).

b6: an aqueous dispersion of a polyester resin (Tg: 45° C.) comprising isophthalic acid (91% by mol), 5-sodium sulfoisophthalate (9% by mol), ethylene glycol (5% by mol), diethylene glycol (40% by mol) and cyclohexane dimethanol (55% by mol).

b7: an aqueous dispersion of a polyester resin (Tg: 47° C.) comprising terephthalic acid (45% by mol), isophthalic acid (45% by mol), 5-sodium sulfoisophthalate (10% by mol), ethylene glycol (3% by mol), diethylene glycol (80% by mol) and cyclohexane dimethanol (17% by mol).

c1: an aqueous dispersion of colloidal silica (average particle diameter: 1 μm).

c2: an aqueous dispersion of colloidal silica (average particle diameter: 0.3 μm).

c3: an aqueous dispersion of colloidal silica (average particle diameter: 0.08 μm).

c4: an aqueous dispersion of colloidal silica (average particle diameter: 0.05 μm).

c5: an aqueous dispersion of cross-linked acrylate particles (average particle diameter: 5 μm).

c6: an aqueous dispersion of silica having a surface treated with alumina (average particle diameter: 0.005 μm).

c7: an aqueous dispersion of colloidal silica (average particle diameter: 0.15 μm).

d1: an acrylic emulsion (Tg: 80°) of a copolymer comprising methyl methacrylate (85% by mol), ethyl acrylate (13% by mol) acrylic acid (1% by mol), N-methylol acrylamide (1% by mol)

d2: an acrylic emulsion (Tg: 35° C.) of a copolymer comprising methyl methacrylate (50% by mol), ethyl acrylate (47% by mol), acrylic acid (1% by mol), N-methylol acrylamide (1% by mol) and acrylonitrile (1% by mol).

e1: an aqueous dispersion of carnauba wax (melting point: about 80° C.)

e2: an aqueous dispersion of paraffin wax (melting point: about 50° C.).

Industrial Applicability

The laminated polyester film according to the present invention is excellent in adhesiveness to various types of paints and inks and, further, excellent in transparency and scratch resistance. Furthermore, since the laminated polyester film according to the present invention has favorable-anti-blocking properties, it is excellent in handling convenience.

The laminated polyester film according to the present invention can be used in many applications such as a card, a label, a photograph and OHP, a receptive sheet base material for thermal transfer, inkjet, offset printing or the like, hard coat film, packaging, magnetic recording medium and the like.

The laminated polyester film according to the present invention is favorable as a laminated polyester film for inkjet printing. Applications for inkjet printing are not particularly limited, so long as they use a inkjet printing method; however, mentioned are, for example, various types of information recording materials such as an OHP sheet, photographic paper and the like, industrial applications, for example, for a large-sized bill board, a poster, for electric decorations, a process chart master and the like.

Further, the laminated polyester film according to the present invention is favorable as a laminated polyester film for a pressure-sensitive adhesive label; on this occasion, it can be used as the pressure-sensitive adhesive label by providing a printing layer on a part of the laminated layer of the laminated polyester film, or providing an tackifier layer on a surface of a side on which the laminated layer is not provided.

What is claimed is:

1. A laminated polyester film characterized in that a laminated layer comprising two types of polyester resins having different glass transition points from each other is formed on at least one side of a base polyester film, wherein said two types of polyester resins comprises a polyester resin (A) having a glass transition point of from 60° C. to 100° C. and a polyester resin (B) having a glass transition point of from 0° C. to 60° C. wherein said polyester resin (B) at least contains from 65% by mol to 95% by mol of isophthalic acid as an acid component or from 50% by mol to 95% by mol of diethylene glycol as a diol component; and wherein the dicarboxylic acid component having a sulfonic acid metal base in the entire dicarboxylic acid components of the polyester resins (A) and (B) satisfies the following relation:

$Sa > Sb \geq 5\%$ by mol wherein

Sa represents a quantity (% by mol) of the dicarboxylic acid component having a sulfonic acid metal base in the entire dicarboxylic acid components of the polyester resin (A); and Sb represents a quantity (% by mol) of the dicarboxylic acid component having a sulfonic acid metal base in the entire dicarboxylic acid components of the polyester resin (B).

2. The laminated polyester film according to claim 1, wherein the polyester resin (A) comprises 70% by mol or more of a terephthalic acid component in the entire dicarboxylic acid components.

3. The laminated polyester film according to claim 1, wherein the polyester resin (B) comprises from 65% by mol to 95% by mol of isophthalic acid as an acid component and from 50% by mol to 95% by mol of diethylene glycol as a diol component.

4. The laminated polyester film according to claim 1, wherein particles contained in the laminated layer satisfies the following relation:

$0.2 \leq r/d \leq 20$ wherein r represents an average particle diameter ($\mu$m); and d represents thickness of the laminated layer ($\mu$m), and are contained at a ratio of from 0.05% by weight to 10% by weight based on a total of two types of polyester resins having different glass transition points from each other on a solid content ratio basis.

5. The laminated polyester film according to claim 4, wherein d is an average thickness of the laminated layer.

6. The laminated polyester film according to claim 1, wherein the laminated layer comprises two types of particles having different particle diameters from one another wherein said two types of particles comprises particles (X) which satisfy the following relation:

$2 \leq r_X/d \leq 20$, and particles (Y) which satisfy the following relation:

$0.2 \leq r_Y/d \leq 4$ wherein $r_X$ represents an average particle diameter ($\mu$m) of the particles (X);

$r_Y$ represents an average particle diameter ($\mu$m) of the particles (Y); and d represents thickness of the laminated layer ($\mu$m).

7. The laminated polyester film according to claim 1, being characterized in that an acrylic resin is contained in the laminated layer.

8. The laminated polyester film according to claim 1, wherein a quantity of the acrylic resin to be contained in the laminated layer is from 0.5% by weight to 8% by weight, based on a total of two types of polyester resins having different glass transition points from each other.

9. The laminated polyester film according to claim 1, wherein a wax component is contained in the laminated layer.

10. The laminated polyester film according to claim 1, wherein a quantity of the wax component to be contained in the laminated layer is from 0.5% by weight to 8% by weight, based on a total of two types of polyester resins having different glass transition points from each other.

11. The laminated polyester film for a printing application, wherein a receptive layer is provided on the laminated layer according to claim 1.

12. The laminated polyester film for a printing application according to claim 11, wherein the laminated polyester film for a printing application is the laminated polyester film for a inkjet printing application.

13. The laminated polyester film for a pressure-sensitive adhesive label application according to claim 1, being for a pressure-sensitive adhesive label application.

14. The laminated polyester film for the pressure-sensitive adhesive label application according to claim 13, wherein a tackifier layer is provided on the laminated layer.

15. The laminated polyester film for the pressure-sensitive adhesive label application according to claim 13, wherein a printing layer is provided on at least a part of the laminated layer.

16. The laminated polyester film according to claim 1, wherein a polyester resin comprising an isophthalic acid component and/or a diethylene glycol component as a principal component is contained in the base polyester film.

* * * * *